(12) United States Patent
Gillett

(10) Patent No.: US 12,179,337 B2
(45) Date of Patent: Dec. 31, 2024

(54) MODULAR ROBOTIC SERVICE VEHICLE

(71) Applicant: Carla R. Gillett, Sacramento, CA (US)

(72) Inventor: Carla R. Gillett, Sacramento, CA (US)

(73) Assignee: Carla R. Gillett, Sacramento, CA (US)

( * ) Notice: Subject to any disclaimer, the term of this patent is extended or adjusted under 35 U.S.C. 154(b) by 556 days.

(21) Appl. No.: 17/337,233

(22) Filed: Jun. 2, 2021

(65) Prior Publication Data
US 2021/0283783 A1 Sep. 16, 2021

Related U.S. Application Data

(63) Continuation-in-part of application No. 16/873,674, filed on Dec. 18, 2019, now abandoned.

(51) Int. Cl.
| | | |
|---|---|---|
| *G06F 17/00* | (2019.01) | |
| *B25J 5/00* | (2006.01) | |
| *B25J 9/16* | (2006.01) | |
| *B25J 11/00* | (2006.01) | |
| *G05D 1/00* | (2006.01) | |

(52) U.S. Cl.
CPC ............. *B25J 11/008* (2013.01); *B25J 5/007* (2013.01); *B25J 9/162* (2013.01); *G05D 1/0011* (2013.01); *G05D 1/0088* (2013.01); *G05D 1/0278* (2013.01); *B25J 9/1697* (2013.01); *G05D 1/0246* (2013.01)

(58) Field of Classification Search
CPC . B25J 11/008; B25J 5/007; B25J 9/162; B25J 9/1697; B25J 9/0084; G05D 1/0011; G05D 1/0088; G05D 1/0278; G05D 1/0246; G05D 2201/0206; B62D 57/022

USPC .......................................................... 180/187
See application file for complete search history.

(56) References Cited

U.S. PATENT DOCUMENTS

| | | | | |
|---|---|---|---|---|
| 6,443,543 | B1 * | 9/2002 | Chiang | G05D 1/0246 |
| | | | | 312/319.7 |
| 8,108,092 | B2 * | 1/2012 | Phillips | G05D 1/0033 |
| | | | | 701/2 |
| 8,139,109 | B2 * | 3/2012 | Schmiedel | G01S 17/86 |
| | | | | 348/148 |
| 8,255,092 | B2 * | 8/2012 | Phillips | G05D 1/0088 |
| | | | | 348/113 |
| 8,346,390 | B2 * | 1/2013 | Ruan | G06N 3/008 |
| | | | | 901/1 |
| 8,430,192 | B2 | 4/2013 | Gillett | |
| | | (Continued) | | |

OTHER PUBLICATIONS

Supervised_control_of_cooperative_multi-agent_robotic_vehicles. pdf (Year: 2002).*

*Primary Examiner* — Ronnie M Mancho

(57) ABSTRACT

The application discloses a modular robotic service vehicle (MRSV) including a chassis and body comprising one or more robotic arms and robotic legs with drive wheel providing stepping, walking and driving capability to transport passengers and/or cargo and a control system comprising kinematics equations providing real-time administration involving controlling one or more robotic legs and/or robotic arms to transition in a retracted position and/or in protracted position for achieving walking, driving, attaining and handling objects. Accordingly, an operator or a Network associating with providing real-time administration involving controlling motion and position of the MRSV according to an assignment relative for walking, driving, attaining and handling objects, and aiding or assisting a user.

20 Claims, 14 Drawing Sheets

(56) References Cited

U.S. PATENT DOCUMENTS

| | | | | |
|---|---|---|---|---|
| 8,947,531 B2* | 2/2015 | Fischer | G01S 17/86 | |
| | | | 348/148 | |
| 9,358,685 B2* | 6/2016 | Meier | B25J 9/163 | |
| 9,420,203 B2* | 8/2016 | Broggi | G01S 17/931 | |
| 9,486,917 B2* | 11/2016 | Reid | B23P 19/06 | |
| 9,586,471 B2* | 3/2017 | Gillett | G05D 1/0276 | |
| 9,791,860 B2* | 10/2017 | Phillips | G01C 21/20 | |
| 10,065,314 B2* | 9/2018 | Tian | G05D 1/0214 | |
| 10,322,507 B2* | 6/2019 | Meier | G05B 13/027 | |
| 10,345,818 B2* | 7/2019 | Sibley | G06Q 10/0833 | |
| 10,625,593 B2* | 4/2020 | Gillett | B25J 5/007 | |
| 10,852,739 B2* | 12/2020 | Sibley | G06Q 10/0832 | |
| 10,890,912 B2* | 1/2021 | Cavender-Bares | A01C 7/004 | |
| 10,890,921 B2* | 1/2021 | Gillett | G05D 1/0088 | |
| 11,199,853 B1* | 12/2021 | Afrouzi | G05D 1/0246 | |
| 11,338,616 B1* | 5/2022 | Fitzhugh | B60B 7/0013 | |
| 11,768,501 B2* | 9/2023 | Sibley | B60P 1/04 | |
| | | | 414/354 | |
| 2004/0168837 A1* | 9/2004 | Michaud | B62D 57/024 | |
| | | | 180/9.46 | |
| 2007/0080000 A1* | 4/2007 | Tobey | B60B 27/0047 | |
| | | | 180/21 | |
| 2015/0375129 A1* | 12/2015 | Tappeiner | A63H 17/40 | |
| | | | 446/454 | |
| 2016/0158932 A1* | 6/2016 | Wyrobek | B25J 5/007 | |
| | | | 180/21 | |
| 2016/0271803 A1* | 9/2016 | Stewart | B25J 11/0085 | |
| 2016/0325432 A1* | 11/2016 | Tian | B25J 19/023 | |
| 2018/0326886 A1* | 11/2018 | Sibley | G06Q 10/08355 | |
| 2019/0248007 A1* | 8/2019 | Duffy | B25J 15/0066 | |
| 2019/0366558 A1* | 12/2019 | Gupta | B25J 11/009 | |
| 2021/0276642 A1* | 9/2021 | Gillett | G05D 1/0891 | |
| 2023/0347513 A1* | 11/2023 | Neville | B25J 5/007 | |

* cited by examiner

MODULAR ROBOTIC SERVICE VEHICLE

CROSS REFERENCED TO RELATED APPLICATIONS

A notice of issuance for a continuation in part in reference to patent application Ser. No. 16/873,674, titled: Modular Robotic Vehicle, filing date: Dec. 18, 2019, and in relation to patent applications; Ser. No. 15/331,820, filing date: Oct. 22, 2016, titled: "Self-Balancing Robot System Comprising Robotic Omniwheel"; Ser. No. 12/655,569, filing date: Jan. 4, 2010 or patent number: U.S. Pat. No. 8,430,192 B2 titled: "Robotic Omniwheel Vehicle"; and to Ser. No. 13/872,054, filing date: Apr. 26, 2013 or patent number: U.S. Pat. No. 9,586,471 B2 titled: "Robotic Omniwheel"; and to Ser. No. 15/269,842, filing date: Sep. 19, 2016 or U.S. Pat. No. 9,902,253 B2 titled: "Yoke Module System for Powering a Motorized Wheel".

FIELD

The embodiment of the application relates to an autonomous vehicle utilizing one or more robotic legs with drive wheel components that enable a vehicle to traverse stairs and rough terrain. In a particular aspect, the robotic leg array providing various degrees of freedom to raise and lower the vehicle in such ways, that one or more robotic arms of the vehicle can attain objects, and can assist an operator.

BACKGROUND

The present robotic vehicles use steering actuators to steer an arrangement of wheel mechanisms to drive in holonomic directions and as well, wheeled legs provide shock absorption when traversing over terrain, but the vehicle is limited to counter stabilize so that the vehicle's robotic arms can attain objects or assist an operator.

SUMMARY

The present application offers a modular robotic service vehicle (MRSV) set a modular chassis coupled to a body configured with robotic legs and robotic arms providing multiple degrees of freedom to attain objects or to assist an operator. The MRSV configurations can be characterized as a utility cart, a wheelchair, a scooter, a truck, an all-terrain vehicle, or other service vehicles comprising control system components and wireless Networks associating with controlling one or more robotic legs are calibrated to step, walk or drive on various pathways. The MRSV control system utilizes posture decision quadratic programming providing real-time technical solutions with respect to controlling motion, position, and performance assignments.

BRIEF DESCRIPTION OF THE DRAWINGS

FIG. 1AA is a side view of the MRSV 100A navigating through a stairway, in accordance with the present application.

FIG. 1BB is a front view of a MRSV 100B navigating through rough terrain, in accordance with the present application.

FIG. 1CC is a perspective view of the MRSV 100C in a stand-up pose, in accordance with the present application.

DETAILED DESCRIPTION OF THE DRAWINGS

Figure 1:
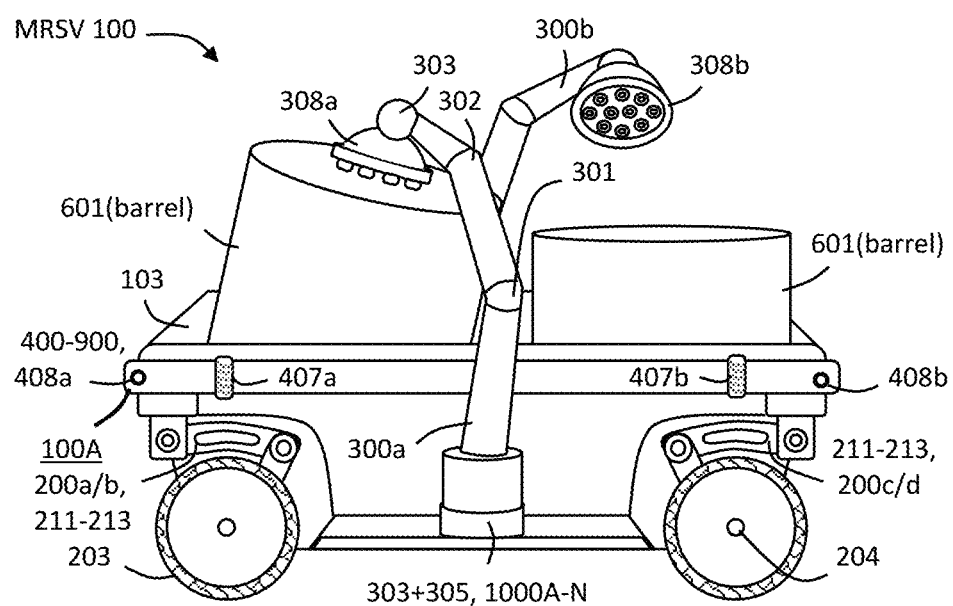
FIG. 1 is a perspective view of a modular robotic service vehicle or MRSV 100, in accordance with the present application.

The present application provides the modular robotic service vehicle in general, the modular robotic service vehicle or (MRSV 100) comprises a modular chassis 101 which is connected to a body 102 and uniquely coupled to a plurality of robotic legs 200 and to one or more robotic arms 300, wherein the MRSV 100 is electrically or wirelessly linked to control system components programmed for controlling motions of the MRSV 100 to walk, drive and handle objects 601, to assist an operator and to perform other feats as exemplified herein.

Figure 7:
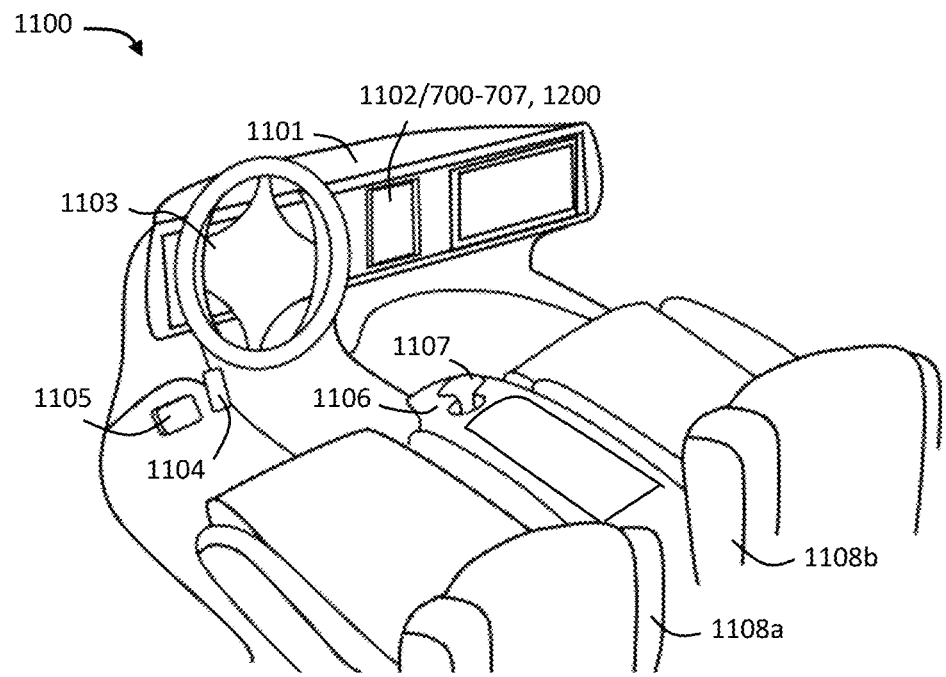
FIG. 7 is a diagram of wireless communication components 700 linked with cab components 1100, in accordance with the present application.

In greater detail FIG. 1 illustrates the MRSV 100 characterized as utility cart 100A configuration for collecting objects 601, wherein the MRSV 100A comprises four robotic wheels 200a-d and two robotic arms 300a-b which allows the MRSV 100 to attain an object 601 and place the object 601 in the receptacle 103, according to object collection assignment 700, detailed in FIG. 7, and the chassis 101 and the body 102. In various dimensions the body is shaped as an object 601 receptacle 103 formed with any size and dimension for receiving objects 601 exampled as barrels 601a-b. Wherein a portion of the chassis 101 and of the body 102 comprise a perception system 407 providing one or more lidar sensors 407 (L) a-b cameras 408a-b, other sensors are possible. Wherein the chassis 101 or body 102 houses various controller linked to a control system 400 providing control system components 401-430 and for achieving operation processes to control navigation and to control attaining or discharging objects 601, via collision avoidance and navigation arrangements.

Figure 3A:
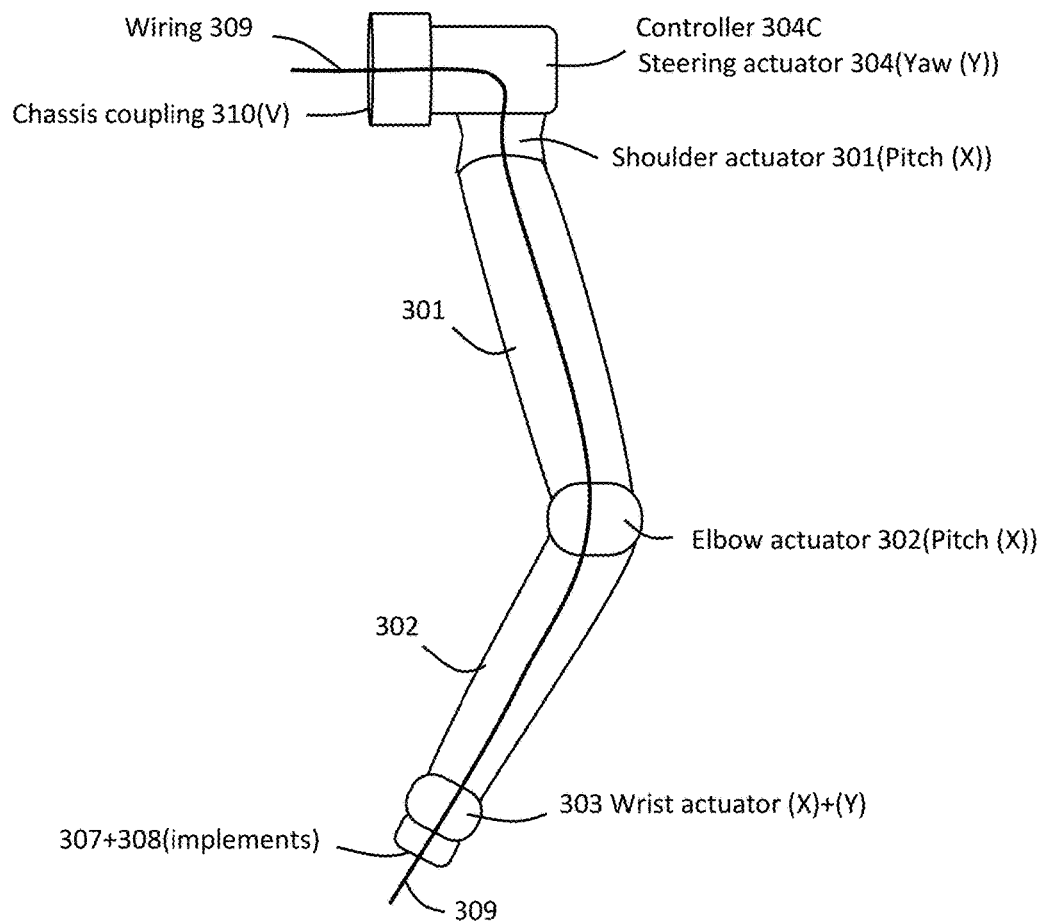
FIG. 3A a front view of a robotic arm 300 configuration, in accordance with the present application.
Figure 3B:
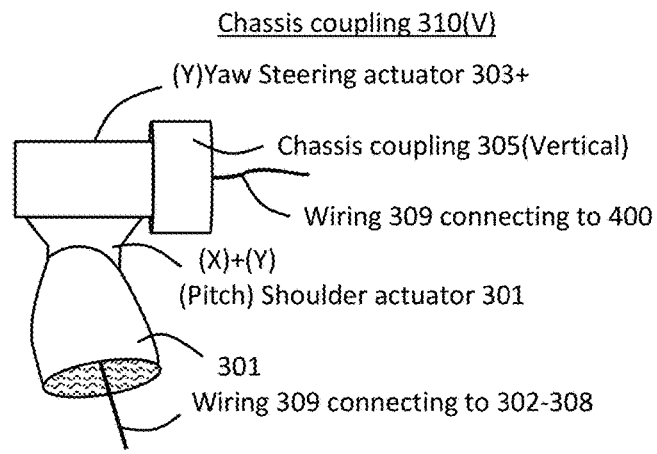
FIG. 3B is a blown up view of the robotic arm 300 with a vertical chassis coupling 310(V) arrangement, in accordance with the present application.

In various operations of the MRSV 100, the object 601 collection assignment 1000(OC) uses one or more robotic arms 300 that are mounted to the chassis 101 respectively, each of the robotic arms 300 are attachable or detachable via a chassis coupling 305 which is situated either horizontal of vertical on the chassis 101 as FIG. 3A and FIG. 3B illustrate.

In various operations, individually the robotic arm 300 is configured to grip an object 601 and put the same into the a top inlet of the receptacle respectively, a compression plate configuration which opens and closes at the top inlet and compresses the object 601 in the receptacle by compact pressure caused from a hydraulic mechanical process, and a side door rotatably mounted to the chassis 101 so as to open and close the side inlet upon dumping out the load of objects 601 when at capacity height or weight limit preferably at a pre-designated disposal site. In various operations the receptacle is also configured for discharging the trash objects 601 by dumping them out through the rear or side, not shown.

In various operations of the control system components 400-1000 associating with one or more motor controllers connecting to various actuators of the plurality of robotic legs and the one or more robotic arms: a perception system associating with sensor 407 and cameras 408 detecting objects 601, and a positioning system 409 utilizing GPS generating various routes: an autonomous drive mode linked with the perception system 407/408, the positioning system 409 to control motion, position and performance of the MRSV 100E, and/or an operator being one of: an onboard operator, a remote operator, a teleoperator, accordingly the operator providing control of motion and position of the MRSV 100E.

Accordingly, MRSV 100A through MRSV 100G may utilize various sizes of robotic legs 200 and robotic arms 300 provided with an array of sensors and cameras for capturing images of objects 601 to avoid or to attain and handle various object 601. Accordingly, the one or more robotic arms 300 allows the MRSV 100 to attain an object 601 or to assist an onboard operator 120.

Figure 1A:
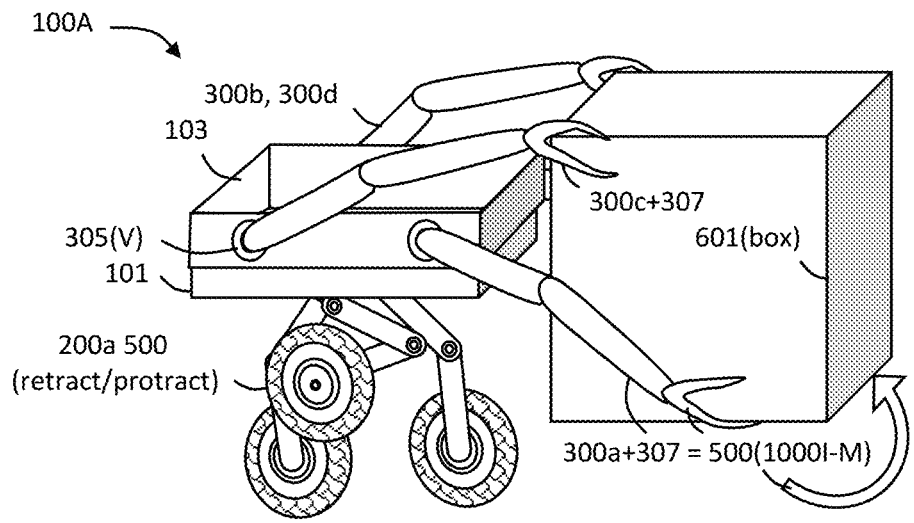
FIG. 1A is a side view of MRSV 100A being a three wheeled utility cart configuration, in accordance with the present application.
Figure 1A:
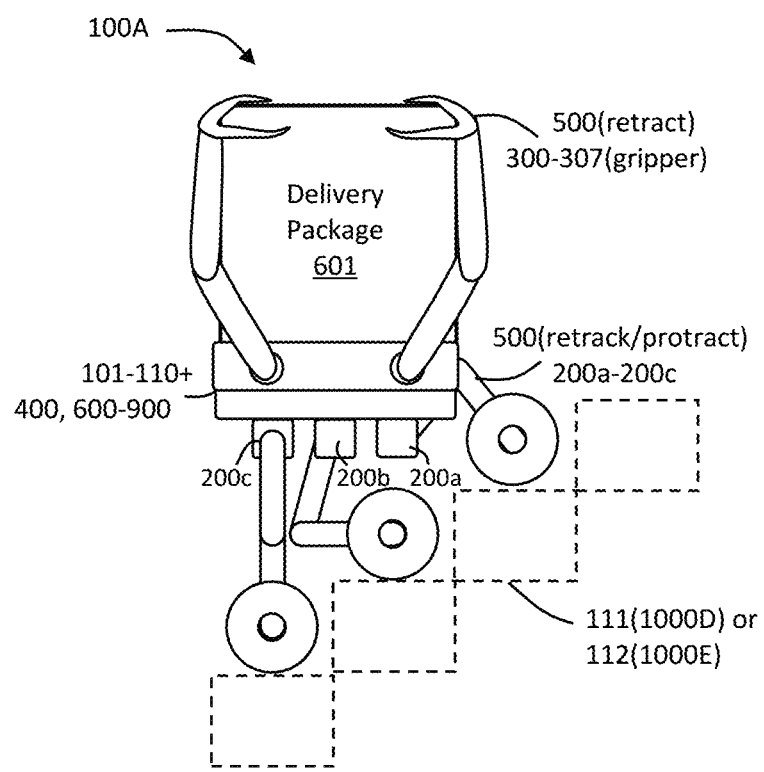

In greater detail FIG. 1A illustrates the identified as MRSV 100 having a compact chassis 101 and light weight body 102, the enhanced chassis 101 is connected to the plurality of robotic legs 200 each having wheel 204 in which works individually for propelling the MRSV 100 to transport an operator 120, a user 140 and/or objects 601 in an operating environment indoors 118 or outdoors 119. Wherein MRSV 100A having a compact chassis 101 and light weight body 102, the enhanced chassis 101 is connected to a series of robotic legs 200 each having wheel 204 which work individually for propelling the MRSV 100A to transport passengers and/or cargo via a receptacle 103. The MRSV 100A navigating through a stairway, the chassis 101 is configured for coupling a compartment to stow cargo objects 601, as shown the tripod like utility cart identified as MRV 100A comprising chassis coupled to three robotic legs 200a, 200b, 200c.

In greater detail FIG. 1AA is a side view of the MRSV 100A shown stair climbing, wherein processors 401 linking to motor sensors, actuators or IMU or accelerometers which function to keep the MRV 100A stabilized whilst traversing to step, or transitioning to drive.

Respectively each leg unit 201-203 is configured with actuators to cause rotation at axis points between the leg units the MRSV 100A can be enhanced to a greater extent through the agile motion states achieved by the robotic leg 200 whereby, each actuator creates flexibly motion states for raising, lowering and undulating to steady the MRV when traversing over various ground surfaces in indoor or outdoor operating environment adaptability.

Figure 1B:
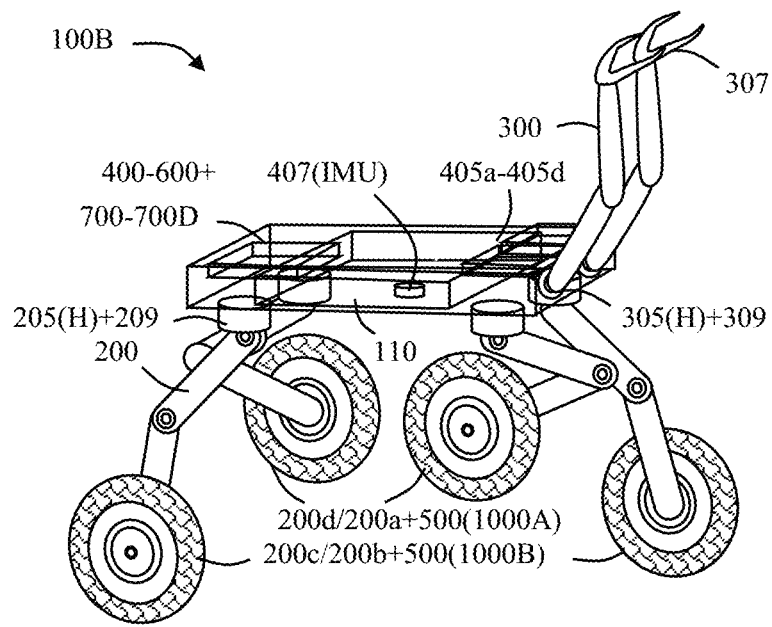
FIG. 1B is a see through view of MRSV 100B being a four wheeled utility cart configuration, in accordance with the present application.
Figure 1B:
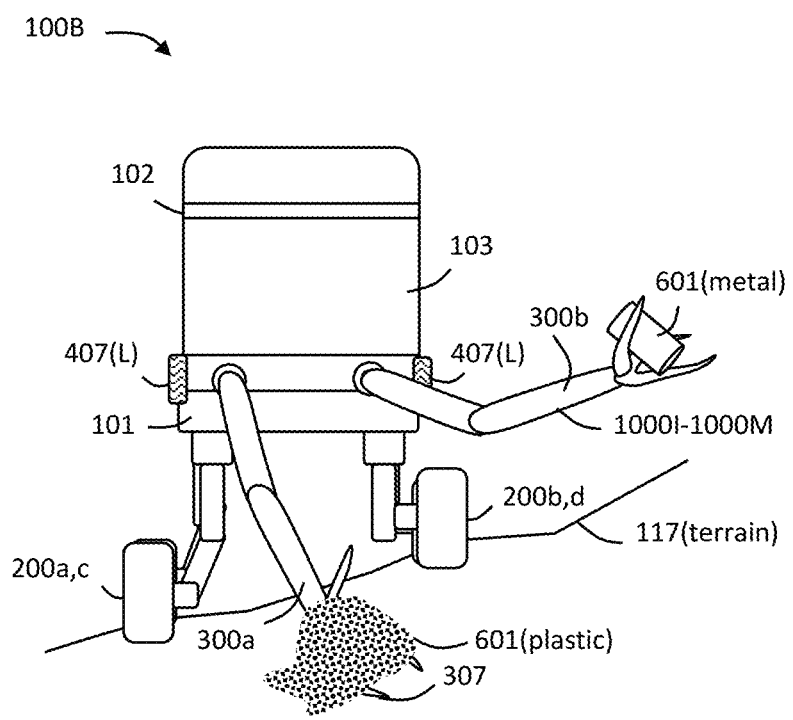

In greater detail FIG. 1B illustrates a utility cart exampled as MRSV 100A wherein the chassis 101 configured with four robotic legs 200a-d for propelling the MRSV 100A at traverse directions. The MRSV 100A is configured with a chassis and body configuration for an all-terrain vehicle for transporting cargo objects 601. Accordingly, the robotic legs 200 are shown in a retracted configuration and to traverse in various ways which makes it easier to reposition the wheelchair in tight spots as well as access stairs, other features are possible.

Accordingly the MRSV 100A configuration comprising two front robotic arms 300a,b having gripping implements 307 for handling object 601. The MRSV 100A is configured with a perception system utilizing an array of sensors 407 and cameras 408 associated with detecting objects 601 and for capturing images surrounding the MRSV 100A.

Accordingly, the MRSV 100A is configured actuator controllers linking to the plurality of robotic legs 200, wherein the actuators providing a retracted pitch position for lowering the MRSV 100A or protracted pitch position to raise the MRSV 100A or actuate traverse directions.

In greater detail FIG. 1BB illustrates a utility cart exampled as MRSV 100A wherein the chassis 101 configured with four robotic legs 200a-d for propelling the MRSV 100A at traverse directions making it easier to reposition over rough terrain. The MRSV 100A configured with a chassis and body configuration for an all-terrain vehicle for one of: policing, search and rescue missions. Wherein the robotic legs 200a-200d adjust the height by repositioning the stance of the robotic legs 200 to traverse over terrain 119, or actuate into opposed respective directions to stabilize the MRSV 100A to reduce driving impact when traversing.

In greater detail FIG. 1BB illustrates a see through view of the chassis configuration, wherein the chassis houses a DC battery 110 (B) linking to the control system via wiring 109.

Accordingly, the plurality of robotic legs 200a-d are capable of retracting a pitch position for lowering the MRSV 100A, protracting pitch position to raise the MRSV 100A, traversing to steer over a route, or actuate into opposed respective directions to stabilize the MRSV 100 whilst traveling on unlevel paths 111/112. Accordingly, the robotic leg 200 causing flexing motion and leveling stability for keeping the MRSV 100 stable when driving on slanted pathways, the robotic leg's pivotal hip joint, knee joint and ankle joint providing pitch states, and the motor of the wheel provides walking and driving capabilities for energy efficient traveling motion. The wheel 203 is configured with either tread or track configurations to smoothly transition through transverse terrain like ramps, stairs, curbs, trenches, hillsides when powered on, and when powered off the wheel advance the MRSV 100 by tiptoeing, stepping walking across sand 113, ice 114, snow 115, mud 116, or crossing rough terrain 117.

Figure 1C:
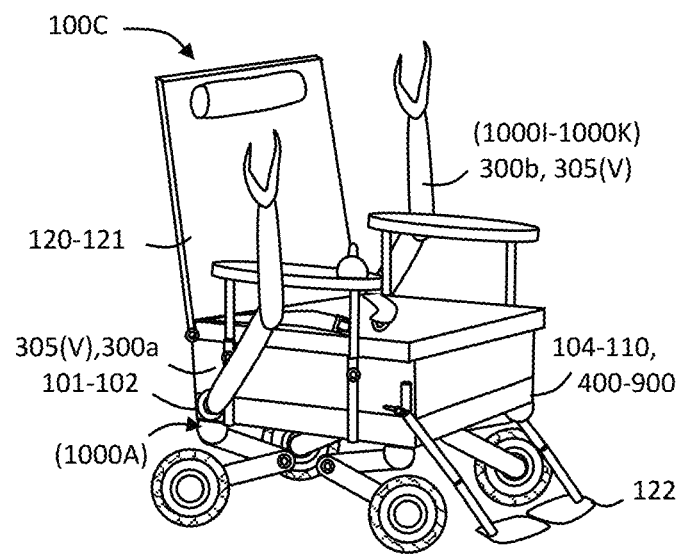
FIG. 1C is a perspective view of a MRSV 100C being a wheelchair configuration, in accordance with the present application.
Figure 1C:
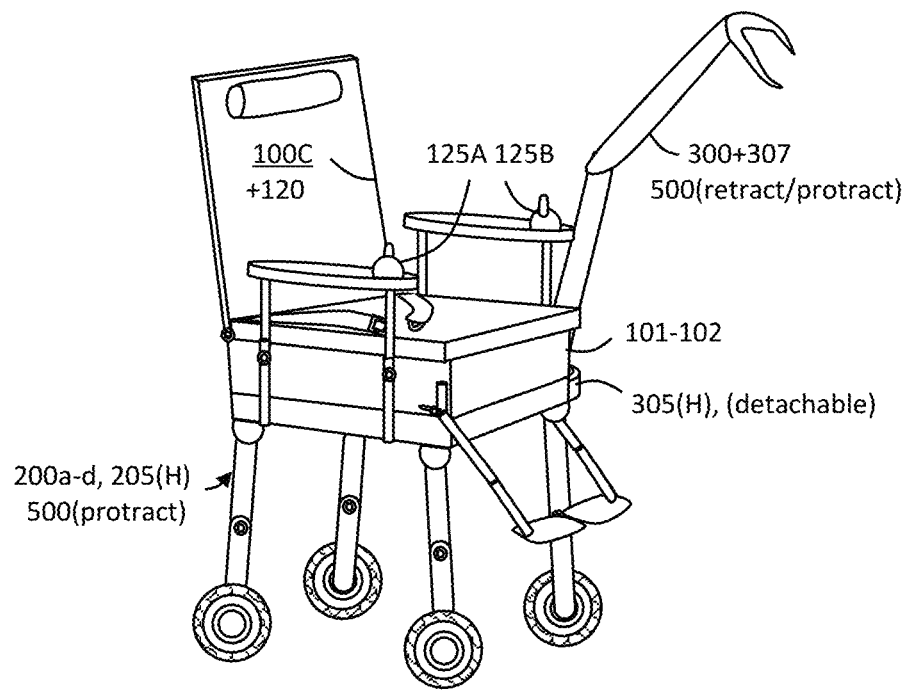

In greater detail FIG. 1C illustrates the MRSV 100C being a wheelchair configuration comprising four robotic legs 200a-d and as an optional the MRSV 100C may utilize two robotic arms 300a and 300b, which are removeable, respectively robotic arms 300a and 300b are utilized for assisting an operator 120. Accordingly. MRSV 100C comprises a chassis 101 and body 102 configuration providing with compartment 103 housing the power system 110 and batteries 110 (B), and stores control system components 401-700.

Accordingly the wheelchair operator 120, per-assignment, may select a joystick controller 125A for systematically configured for controlling plurality of robotic legs 200 to lower the chassis to make it easier for accessing the wheelchair seat 121, and at the same time, can select a joystick controller 125B for systematically controlling the one or more robotic arms 300 to reach for something or to help the operator with something.

Accordingly, the chassis 101 is configured like a common wheelchair when getting on and off, the operator 120 can remove the modifiable leg and foot supports 122, the seat 121 has seatbelts, and the chair back can be reclined.

In various elements, the MRSV 100C is configured for in indoor 118 or outdoor 119 use.

Accordingly the operator 120 onboard may utilize a control console 1101 which is provided for selecting assignments 1000, wherein the operator programs an object management subsystem 600 to assist the selection of items i.e., objects 601. Accordingly, for controlling motion and position the operator 120 to program steering motion and motor velocity of the MRSV 100C based on posture decision quadratic programming 500.

Accordingly the operator 120 onboard may utilize a joystick controller 125B configured for manually controlling the robotic arm 300. Accordingly, the joystick controller 125B to reach and handle objects 601, or the operator 120 may utilize posture decision quadratic programming 500 for systematically extending robotic arm 300 during an assignment to reach and handle objects 601 and to assist the operator by gently holding the operator in such a way to lift her or him onto the seat 121, accordingly other assignments 1000, as example is FIG. 5.

Accordingly the operator 120 onboard may utilize an autonomous driving mode 406 via posture decision quadratic programming 500 to control maneuvers of robotic legs 200a-200d based on sensors 407 and cameras 408 of the MRSV 100C to achieve self-driving autonomously based on sensor data and camera data.

Accordingly the robotic legs 200a,c are shown in a retracted configuration and to traverse in various ways which makes it easier to reposition the MRSV 100C in tight spots as well as access stairs 111, other features are possible, and robotic legs 200b,d are shown in a protracted configuration to step or walk during autonomous walking mode 405 via posture decision quadratic programming 500.

Accordingly the MRSV 100C lowers to a parked configuration to receive the operator 120, when onboard, the operator 120 utilizes autonomous parking assignment the posture decision quadratic programming 500 adjust the repositioning pose to whichever the operator 120 prefers.

Accordingly, the operator 120 can adjust the height by repositioning the stance of the robotic legs 200 to traveling on stairs and ramps 111/112 and other surfaces 113-119, or wherein the robotic legs 200 are shown in a retracted configuration and to traverse in various ways which makes it easier to turn around in tight spots, other navigation assignments 1000 are possible.

In greater detail FIG. 1CC illustrates the MRSV 100C wheelchair is systematically configured for controlling plurality of robotic legs 200 to raise the chassis to make it easier for accessing counter tops and be at stand-up height and for to raise the MRV 100C at counter height or adjust the user 120 to be at a height for standing up. Wherein the robotic legs 200 are shown in a protracted configuration and however to traverse on stairs 111, accordingly the robotic legs 200a-200d autonomously can reposition as needed for stability of the MRSV 100C.

Accordingly underneath the chassis 101 the plurality of robotic legs 200a-200d via chassis coupling 210 (H), wherein the robotic legs 200a-200d comprises wheels 104 having an inflated or noninflatable tire (IN/NIT).

Accordingly the operator 120 can adjust the height by repositioning the stance of the robotic legs 200a-200d to traverse over stairs-terrain 111-117, or wherein the robotic legs 200 are shown in a retracted configuration and to traverse in various ways which makes it easier to reposition the scooter to access curbs, other navigating feats are possible.

Figure 1D:
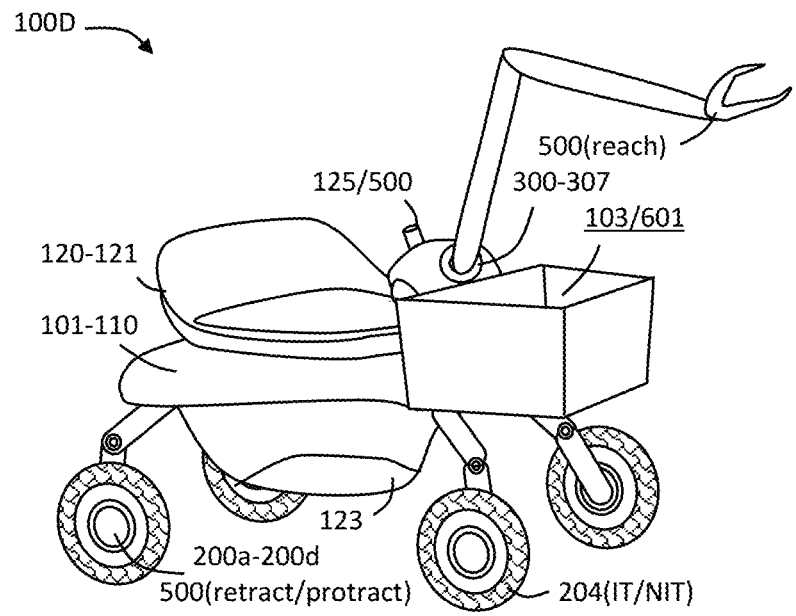
FIG. 1D is a perspective view of MRSV 100D being a scooter configuration, in accordance with the present application.

In greater detail FIG. 1D illustrates the MRSV 100D characterized as a scooter configured for in indoor 118 or outdoor 119 use, wherein the chassis 101 comprises a chair 121 and a footing platform 123 situated on the body 102, underneath the body the chassis 101 is connected to a plurality of robotic legs 200a-200d, wherein the wheels 104 having an inflated or noninflatable tire (IN/NIT).

Accordingly the operator 120 onboard may utilize a control console 1101 which is provided for shopping assignments, wherein the operator programs an object management subsystem 600 to assist the selection of items i.e., objects 601. Accordingly, for controlling motion and position the operator 120 to program steering motion and motor velocity of the MRSV 100D based on posture decision quadratic programming 500.

Accordingly the operator 120 onboard may utilize a joystick controller 125 configured for manually controlling the robotic arm 300.

Accordingly the operator 120 onboard may utilize the autonomous driving mode 406 via posture decision quadratic programming 500 to control maneuvers of robotic legs 200a-200d based on sensors 407 and cameras 408 of the MRSV 100D to achieve assignments 1000 based on sensor data and camera data.

Accordingly the robotic legs 200a,c are shown in a retracted configuration and to traverse in various ways which makes it easier to reposition the MRSV 100D in tight spots as well as access stairs 111, other features are possible, and robotic legs 200b,d are shown in a protracted configuration to step or walk during autonomous walking mode 405 via posture decision quadratic programming 500.

Accordingly the MRSV 100D lowers to a parked configuration to receive the operator 120, when onboard, the operator 120 utilizes autonomous parking assignment the posture decision quadratic programming 500 adjust the repositioning pose to whichever the operator prefers.

Figure 5:
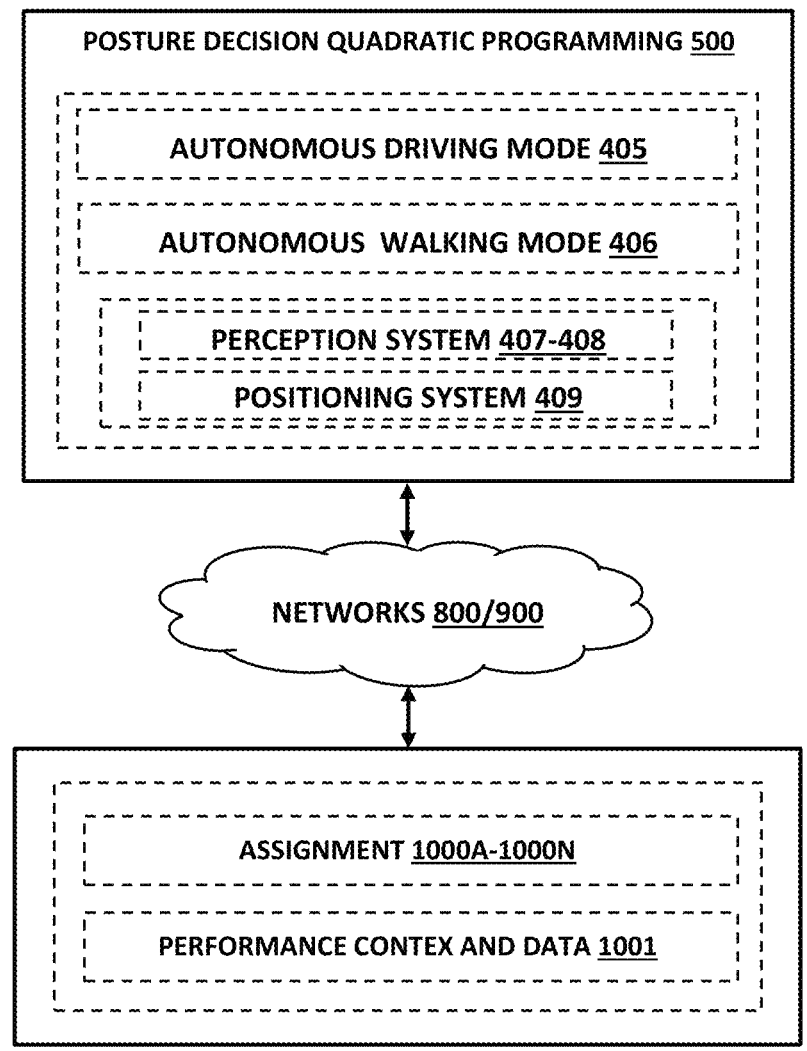
FIG. 5 is a diagram of posture decision quadratic programming 500 configuration, in accordance with the present application.

Accordingly the operator 120 onboard may utilize the joystick controller 125B to reach and handle objects 601, or the operator 120 may utilize posture decision quadratic programming 500 for systematically extending robotic arm 300 during an assignment to reach hard to get objects 601, such as when shopping for groceries, other assignments 1000 are possible, as example is FIG. 5.

Accordingly the control system 400, the operator 120 can adjust the height by repositioning the stance of the robotic legs 200a-200d to traverse over stairs-terrain 111-117, or wherein the robotic legs 200 are shown in a retracted configuration and to traverse in various ways which makes it easier to reposition the scooter to access curbs, other navigating feats are possible.

Figure 1E:
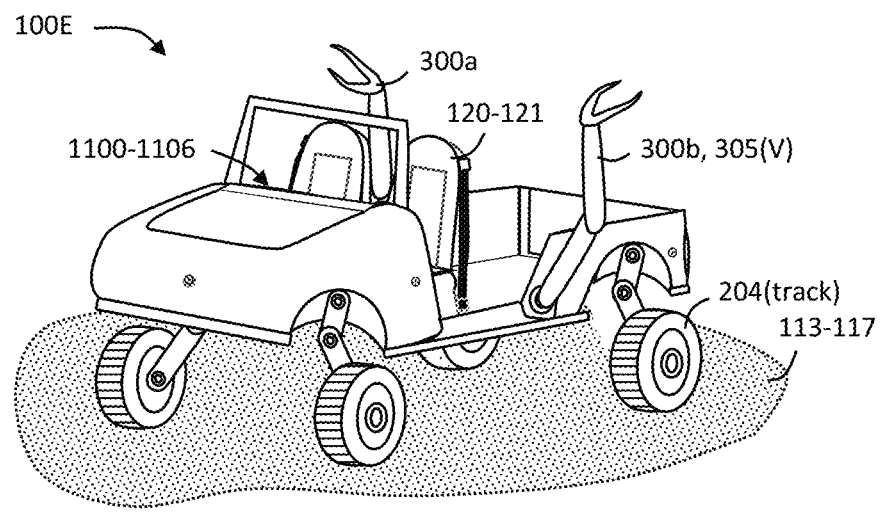
FIG. 1E is a perspective view of a MRSV 100E being a truck configuration, in accordance with the present application.

In greater detail FIG. 1E illustrates the MRSV 100E truck configuration with a cab comprising 1100, and utilizes four robotic wheels 200a-200d and two robotic arms 300a-300b which situate on opposing sides of a truck bed 103. Accordingly, an onboard operator 120 engages the autonomous drive mode 406 to control steering of one or more robotic legs 200 and to control the velocity of motor 204.

Accordingly, the control system of MRSV 100E configured with cab components 1100, wherein a steering controller is linked to a steering wheel 1106 to control steering, and motor speed is controlled by pedals for throttle 1107 and braking 1108 for controlling the velocity of motor 204, and joystick controller for selecting operating modes 405/406.

Accordingly the operator 120 onboard may utilize the autonomous driving mode 406 via posture decision quadratic programming 500 to control maneuvers of robotic legs 200a-200d based on sensors 407 and cameras 408 of the MRSV 100D to achieve assignments 1000 based on sensor data and camera data.

Respectively posture decision quadratic programming 500 autonomously controls maneuvers of robotic legs 200a-200d by wireless communication when operating.

Respectively posture decision quadratic programming controls 500 when operating in rural routes maneuvers of the MRSV 100E by wireless control via remote operation through Networks 800-900.

In an embodiment of the MRSV 100E, wherein the chassis 101 couples to a steering motor 207 which is connectively linked to a control system 400, the control system 400/500 controls motion and placement of the MRSV 100E.

Accordingly, the control system of MRSV 100E configured with cab components 1100 which allows an operator 120 during semiautonomous operation to manually control the MRSV 100E to control steering of the robotic legs 200a-200d and for controlling the velocity of motor 204, and utilizing cab components 1101-1114, as exampled in FIG. 7.

In an embodiment of the MRSV 100E, wherein the steering motor 207 of the robotic legs 200a-200d is connectively linked to the control system components 400/500 control a steering direction of each robotic leg 200 to transversally navigate a GPS 409 mapped path.

Accordingly controlling plurality of robotic legs 200a-200d can be achieved from bi-wire control linked to posture decision quadratic programming for controlling maneuvers of each robotic leg respectively to alternatively transition from various retracted and protracted configurations which allows the MRSV to step, walk on steps, curbs, ramps, and drive on various pathways or terrain 113-117.

Respectively posture decision quadratic programming controls maneuvers of robotic leg to cause one or more action: raising, lowering, bobbing and undulating so that MRSV 100E is stabilized when traversing over various surfaces, and/or flexibly transposing to hoist the MRSV 100E over uneven terrain as the wheels 204 of the leg array 200 provide various degrees of motion states for stepping, walking, and driving according to assignments 1000 achieved through control system components 400-1100.

Figure 1F:
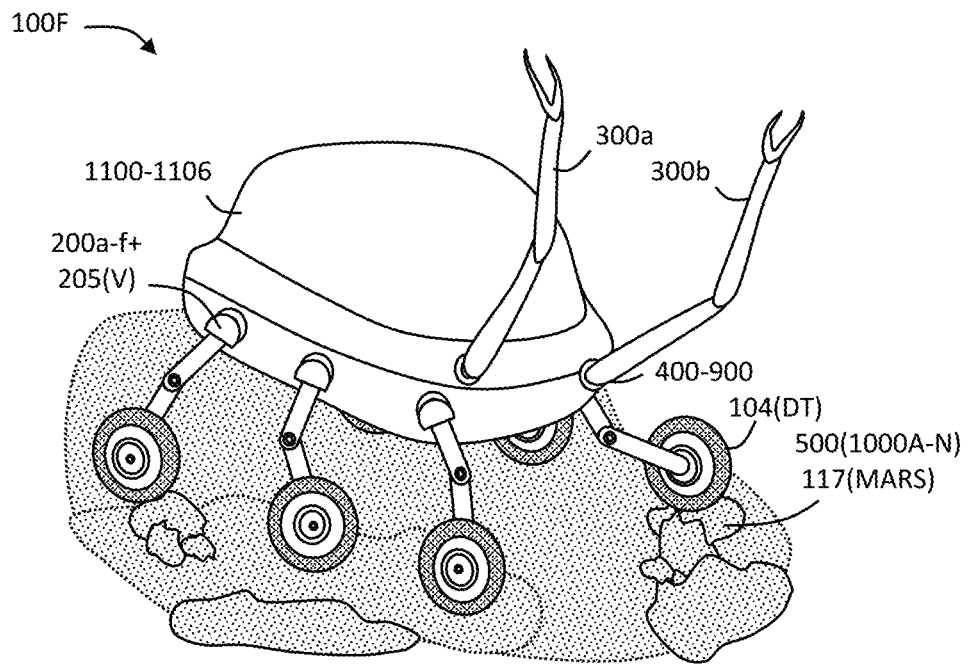
FIG. 1F is a perspective view of a MRSV 100F being an all-terrain vehicle (ATV) configuration, in accordance with the present application.

In greater detail FIG. 1F illustrates the MRSV 100F all-terrain vehicle (ATV) configuration comprises robotic legs 2002-200f and four robotic arms 300a-300d connectively linked to the control system 400 for handling objects 601. As detailed in FIG. 1E, the MRSV 100F has similar control system components 400-900 for accomplishing control of the MRSV 100F and comprises cab components 1101-1114. Accordingly, the MRSV 100F comprises an enclosed cab for accommodating passengers.

Accordingly, like MRSV 100E, the MRSV 100F is configured with cab components 1100. Accordingly, an onboard operator engages an autonomous drive system 500 through the control system 400, the autonomous operating systems 405/406 is linked to a steering wheel 1106 to control steering of one or more robotic legs 200, and linked to throttle 1107 and braking 1108 pedal for common driving methods for controlling the velocity of motor 204.

Respectively posture decision quadratic programming controls maneuvers of robotic legs 200a-200d by wireless control via remote operation processes through Networks 800-900.

In an embodiment of the MRSV 100F, wherein the chassis 101 couples to a steering motor 207 which is connectively linked to a control system 300, the control system 300 controls motion and placement of the MRSV 100F making it easier to reposition over rocky terrain, the MRSV 100F configured with an all-terrain vehicle for one of: scientific space exploration, sporting events or riding for amusement. Wherein the cab components 1100 are detailed in FIG. 7.

In various elements the control system utilizes the positioning system for generating GPS route and mapping locations or travel destinations.

In various elements the control system 400 of MRSV 100F is configured with a controller device controlling plurality of robotic legs 200 during an autonomous walking mode 405 and/or during an autonomous drive mode 406 based on sensor data, camera data and GPS data linking to the control system 400.

Accordingly the power system 110 providing from at least DC electricity via batteries 110 (B), or one of hydraulics, pneumatics, hybrid motor system, hydrogen, a nuclear power source is possible for space exploration.

Wherein the robotic legs 200 further comprising a gearing system and gear bearings for heavy duty MRSV and may utilize a spring damper 207 and/or a clutch mechanism 211 disposed on the chassis provided additional shock absorption at the steering controller section. The spring damper 212 to reduce bounce impact and the clutch mechanism 211 for traversing smoothly over bolder, gaps, and other ruff obstacles. Accordingly, the MRV 100F is configured actuator controllers linking to the plurality of robotic legs 200, wherein the actuators providing one of, a retracted pitch position for lowering the MRV 100G, or protracted pitch position to raise the MRV 100F, or actuate into opposed respective directions, or into a retracted pitch position for lowering the MRV 100F, or protracted pitch position to flexibly transpose the leg array 200 to step, walk, or drive omni-directional "crab like" motions.

Figure 1G:
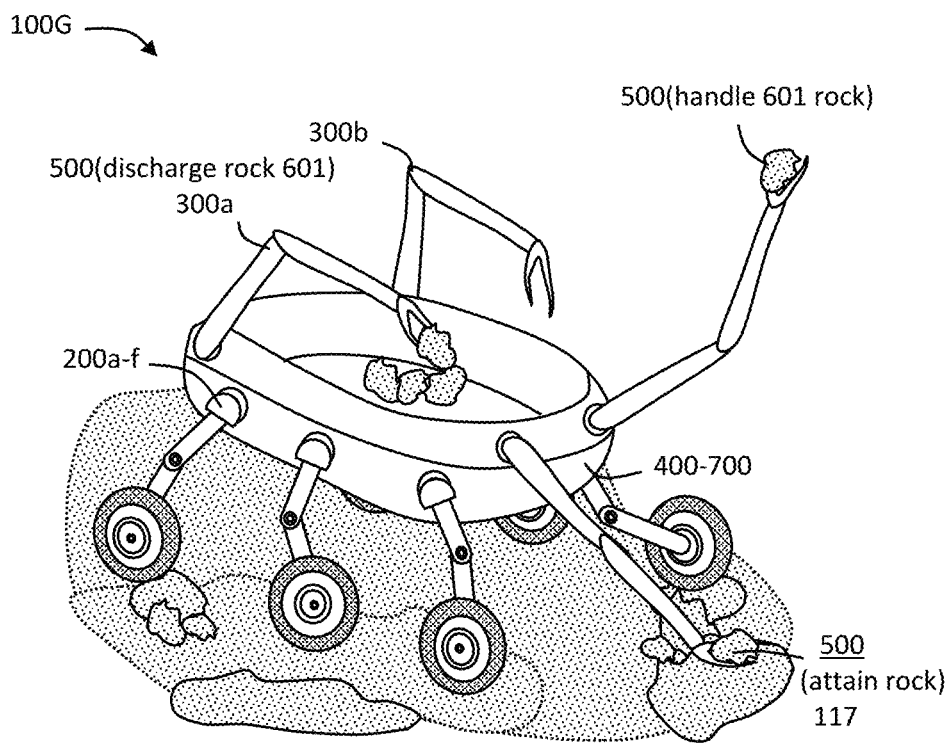
FIG. 1G is a perspective view of a MRSV 100G being an ATV configuration, in accordance with the present application.

In greater detail FIG. 1G illustrates the MRSV 100G ATV with comprising six robotic wheels and four robotic arms for handling objects 601, as shown the robotic arms 300d-300d allows the MRSV 100G to attain an object 601 and place the object 601 in the receptacle 103, according to object collection assignment 1000, and the chassis 101 and the body 102. In various dimensions the receptacle 103 is formed for receiving an object 601 exampled as rocks.

The MRSV 100G is connectively linked to a control system 400, the control system 300 controls motion and placement through the posture decision quadratic programming 500 to alternatively transition from various retracted configurations into various protracted configurations which allows the MRSV 100G to step, walk and drive on various pathways and terrain, or controlling a steering motor 206 to control a steering direction of the robotic leg 200 to navigate over various surfaces 114-116, and/or the robotic legs 200a-200f are programmed for flexibly transposing i.e., outward and upward to hoist the MRSV 100G over rough terrain 117, examples as rocky obstacles.

Accordingly, wireless communication 700 associating with GPS 409 generating route for mapping location destinations for navigating via GPS satellites.

Accordingly, wireless communication 700 associating with Posture Decision Quadratic Programming 500 initiated for autonomous control modes 405 based on robotic legs 200 and autonomous control modes 406 based on PDQP assignments 1000A-1000N, detailed in FIG. 5.

Accordingly, control system 400 configured for controlling motion and position of the MRSV 100 autonomous walking mode 405 and/or during the autonomous driving mode 406 of the MRSV 100 based on sensor data and camera data linking to the control system 400.

Figure 2A:
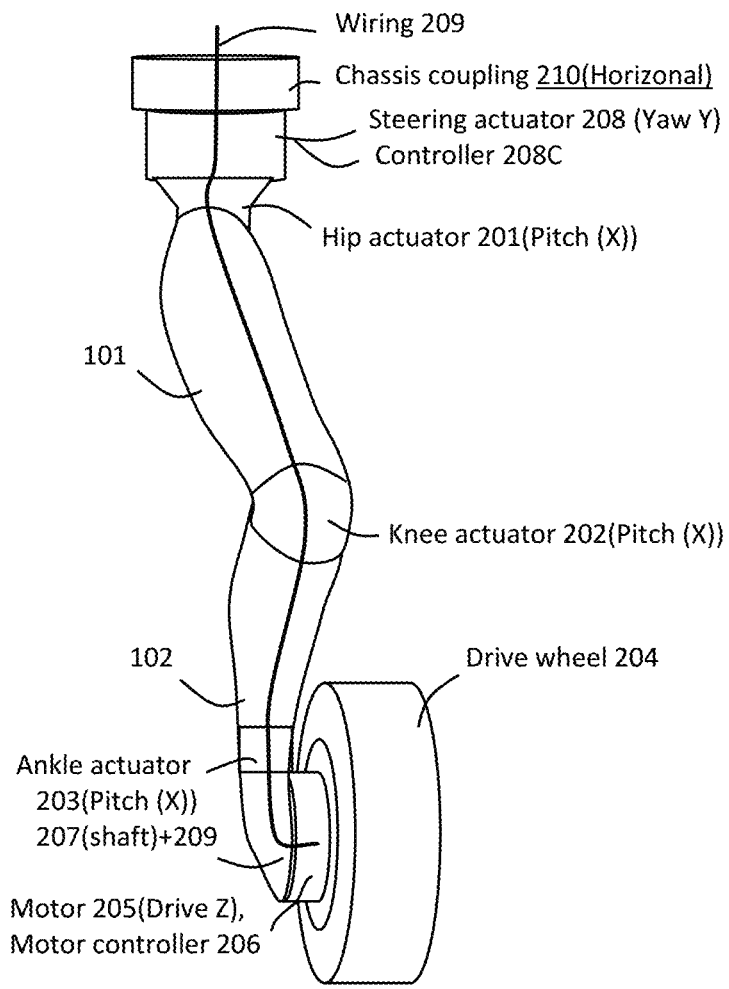
FIG. 2A is a front view of a robotic wheel 200 configuration, in accordance with the present application.
Figure 2B:
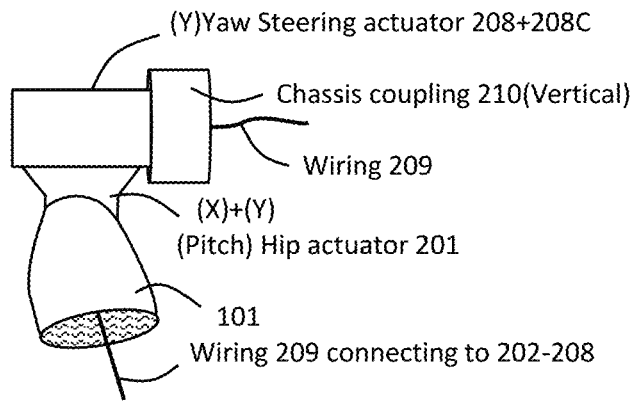
FIG. 2B is a blown up view of the robotic leg 200 with a vertical chassis coupling 210 (V) arrangement, in accordance with the present application.

In greater detail FIG. 2A illustrates a robotic leg 200 configuration with a horizontal chassis coupling 210 (H) arrangement, and FIG. 2B is the robotic leg 200 with a vertical chassis coupling 210 (V) arrangement. Respectively each robotic leg 200 is configured with a wheel 204 including a DC motor 205 providing (Drive Z), and a motor controller 106. Wherein the robotic leg 200 further comprises a hip actuator 201 provides X axis and Y axis of rotation: a knee actuator 202 have a Y axis of rotation: an ankle actuator 203 providing X axis and Y axis of rotation, accordingly the wheel 204 is rotatably connected at an end of the ankle actuator 203, and a shaft 207 extending within, and a steering actuator 208 having a controller 208C. The various actuators 201-203 having servo like motors to pivot like joints of the robotic leg 200 and wheel's motor 405 being DC powered via the power system 110/batteries 110 (B) contiguously wired 209 via connectors 209C therethrough via the shaft 207.

In various elements the chassis coupling 210 being any dimension and is situated horizontal or vertical on the chassis 101, wherein the chassis coupling 210 being detachable. Accordingly, the chassis coupling 210 sets horizontal or vertical at the steering actuator 208, the steering actuator 208 will turn the robotic leg 200 in various directions. Wherein the controller 208C controls the steering speed and is linked to the control system 400 through wiring 209 having connectors.

Wherein the wheel 204 further comprising an outer perimeter forming one of: a tire, a track, a noninflatable composite, or an arrangement thereof. Respectively when powered off, the wheel 204 can act like a foot allowing the MRSV 100 to step on various surfaces and paths 111-117. Accordingly, the robotic leg is pivoted by the steering actuator 208 providing (Yaw Y) is connected to a controller 208C which works to pivot the robotic leg 200 forward and backward at multiple degrees.

In various elements, the beneficial effects brought by the leg array's wheel 204 and motor 205 and wiring 209 which indirectly connects to a controlled power system 110 provided by batteries 110 (B), or provided by alternative power like hybrid vehicle technology, preferable the batteries 110 (B) charged from clean energy preferably.

In various motion states, the actuators 201, 201, 202 flexibly cause one or more actions like raising, lowering, bobbing and undulating so that MRSV 100 is stabilized when traversing over various surfaces, and/or flexibly transposing to hoist the MRSV 100 over uneven terrain as the wheels 104 of the leg array 200 provide various degrees of motion states for stepping, walking, and driving.

Accordingly, the robotic legs 200 can be easily replaced if one mal functions, this is achieved by the chassis coupling 210, and wherein the robotic arms 300 can be easily replaced if one mal functions, this is achieved by the chassis coupling 305.

Accordingly the motion of the robotic leg 200 is controlled by posture decision quadratic programming 500 for controlling maneuvers of robotic leg 200 to alternatively transition from various retracted configurations into various protracted configurations which allows the MRSV 100 to step, walk and drive on various pathways and terrain, or controlling a steering motor 206 to control a steering direction of the robotic leg to navigate on a path.

As FIG. 2A illustrates the robotic leg 200 can be any size and shape, individually the robotic leg 200 further comprises a steering actuator 208, accordingly the chassis coupling 210 can connectively be attached horizontal or vertically on a side/corner section of the chassis 101.

In various navigating elements the modular robotic service vehicle in which the wheel providing right and left differential steering propulsion via a DC motor 205 having braking capability.

As shown in FIG. 2A the actuators 201, 201, 202 disposed on the chassis 101, when combined or when independent each work to stabilize and support the MRSV 100, wherein the spring damper connects to a leg section by pivoting brackets 213 such that the spring damper cushions impact to the robotic leg actuator 201-203 similar to a common vehicle suspension system, the clutch mechanism 211 to alternatively transition the spring damper 212 from various retracted configurations into various protracted configurations which allows the MRSV to extend outwardly, or to raise or lower the MRSV, or to control a reaching direction of the robotic leg to step over an obstacle, as exampled in FIG. 1G.

In various operations of a robotic leg motion assignment 1000 is controlled by posture decision quadratic programming 500 for controlling maneuvers of robotic leg 200 to alternatively transition from various retracted configurations into various protracted configurations which allows the MRSV to extend outwardly, or to raise or lower the MRSV, or to control a reaching direction of the robotic leg to step over an obstacle, as exampled in FIG. 1G.

In greater detail FIG. 2B illustrates a blown up view of the robotic leg 200 comprising the chassis coupling 210 is exampled as being situated vertical 210 (V) either way, wherein the chassis coupling 210 is electrically connecting the robotic leg 200 to situate on the front section of the chassis, on side sections of the chassis, on the rear section of the chassis, respectively.

In one element the chassis coupling 210 H/V being connectively attached or detached to a steering actuator 208 in which laterally turns to steer a robotic leg 200 connecting thereon, and wherein the coupling being connectively attached or detached to a steering actuator 208 in which a controller 208C laterally turns to steer the robotic leg connected thereon, the controller 208C is indirectly linked to the control system 400/500 via wiring 209, wherein the chassis coupling 210 can be any dimension and connectively wired to through the chassis 101.

In greater detail FIG. 3A illustrates the one or more robotic arms 300 can be any size and shape, accordingly the one or more robotic arms which allows the MRSV 100 to attain an object 601 or to assist an operator 120 riding on board, wherein one or more robotic arms 300 each comprising a shoulder actuator 301, an elbow actuator 302, and a wrist actuator 303, and an implement 307/308 is connecting at an end of the wrist actuator 303. Wherein the robotic arm is 300 extendable providing multiple degrees of freedom in a vertical configuration or in horizontal configuration achieved by a steering actuator 304 having a controller 304C, and wherein the robotic arm actuators 301-303 and implement 307/308 are electrical wired by wiring 309 and connections linked to the control system 400/500, which control motions and functions of the gripper 307 and the suction mechanism 308.

In various elements the chassis coupling 310 being any dimension and is situated horizontal or vertical on the chassis, wherein the chassis coupling being detachable. Accordingly, the chassis coupling 310 sets horizontal or vertical at the steering actuator 304, the steering actuator 304 will turn the robotic arm 300 in various directions. Wherein the controller 304C controls the steering speed and is linked to the control system 400 through wiring 309 having connectors.

As shown in FIG. 3A, the shoulder actuator 301 provides X axis and Y axis of rotation, the elbow actuator 302 have a Y axis of rotation, a wrist actuator 303 providing X axis and Y axis of rotation, an implement 307 is a motorized gripper rotatable connected at an end of a wrist actuator 303. Respectively, the shoulder actuator 301, elbow actuator 302, and wrist actuator 303 providing multiple degrees of pivoting freedom in a vertical configuration or in horizontal configuration to retract and to protract to reach outwardly to attain an object 601.

Accordingly the implement 307/308 is detachable, wherein the implement can be configured as a gripper 307 or like hand as exampled, and as a suction mechanism 308 exampled in FIG. 1, wherein the suction mechanism 308 is configured for attaching on to an object 601, and then discharging the object 601.

In greater detail FIG. 3B illustrates a blown up view of the robotic arm's chassis coupling 310 (V) to set vertical adjacent with the chassis 101. Wherein the chassis coupling 310 is electrically connecting the robotic arm, via wiring 309. The chassis coupling 310 (V) to situate on the front section of the chassis 101, on side sections of the chassis 101, and/or on the rear section of the chassis 101.

Accordingly the motion of the robotic arm 300 is controlled by posture decision quadratic programming 500 for controlling maneuvers of robotic arm 300 to alternatively transition from various retracted configurations into various protracted configurations which allows the robotic arm 300 to handle objects 601 based on PDQP assignments 1000A-1000N.

Figure 4:
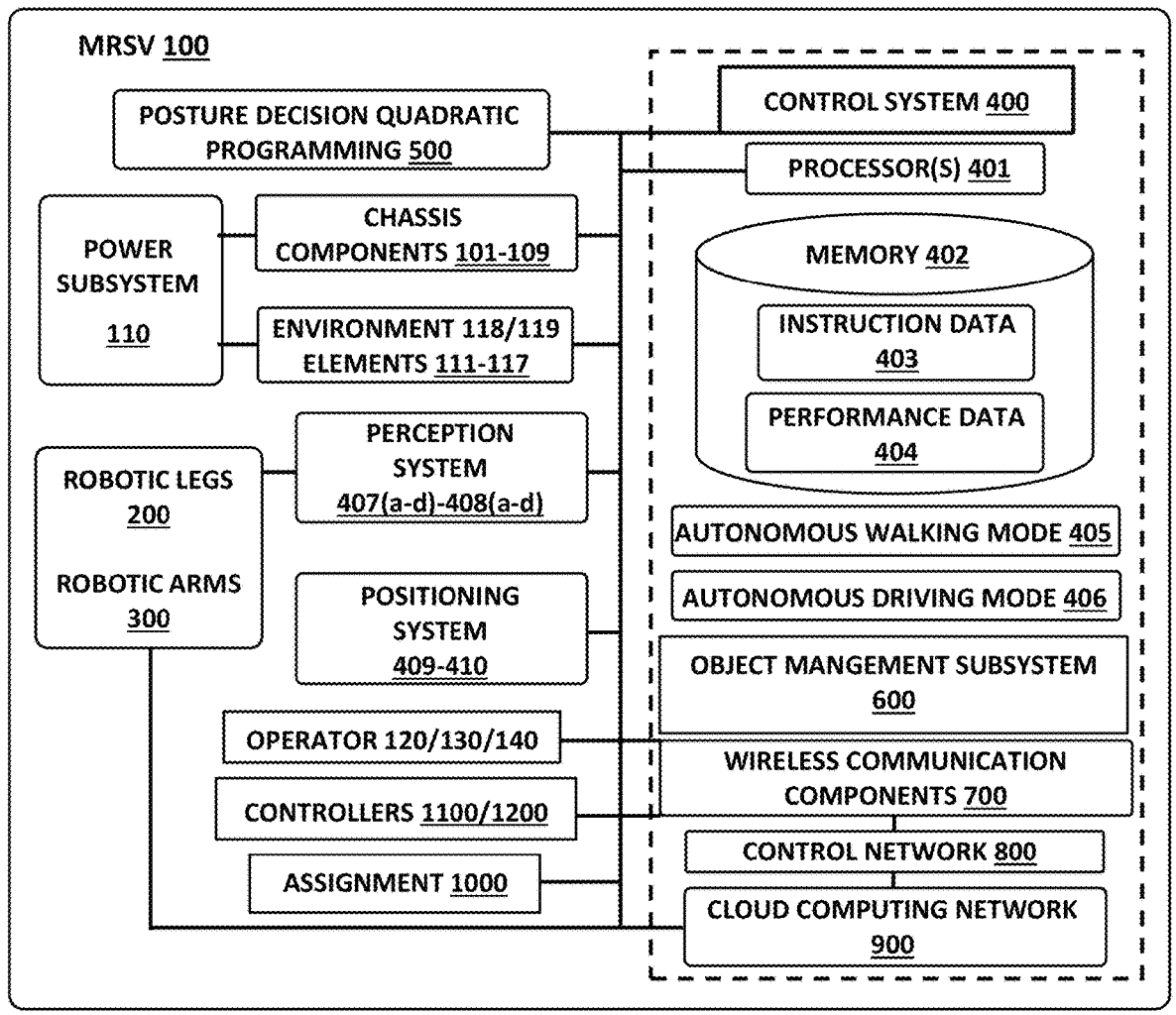
FIG. 4 is a diagram of a control system 400 configuration, in accordance with the present application.

In greater detail FIG. 4 illustrates a diagram of the control system 400 associating with controlling the MRSV 100A through MRSV 100G includes operating processes for collision avoidance and navigation arrangements involving autonomous walking mode 405 and/or an autonomous driving mode 406 to control motion, position and performance of the MRSV 100, and posture decision quadratic programming 500 for controlling a plurality of robotic legs to maneuver the MRSV 100 at multiple degrees of freedom to step, walk or drive on various terrain, and/or for controlling one or more robotic arms to maneuver the MRSV 100 at multiple degrees of freedom for handling one or more objects 601 a perception system utilizing an array of sensors 407 associating with detecting objects 601, and cameras 408 for capturing images surrounding the MRSV 100 and generating object 601 data, and wherein the positioning system uses GPS 409 for generating a current location and for generating various routes and pick-up destinations with respect to a user 140 needing a ride.

The control system associating with autonomous walking mode 405 and/or an autonomous driving mode 406 linked with the perception system 407-408, the positioning system 409 to control motion, position and performance of the MRSV 100.

The control system associating with a wireless communication components 700 providing various I/O devices, wherein the wireless communication components 700 linking to a control network 800 providing teleoperator instruction (ToI) to control motion, position, performance, or a context assignment with respect to cloud computing networks 900 providing real-time administration by teleoperation processes to control motion, position, performance or to determine context assignments with respect to a user 140.

The wireless communication components 700 associating a server of the control network 800 providing teleoperator instruction (ToI) 802 to control motion, position, performance, or context involving: controlling a steering motor to control a steering direction of a robotic leg 200 according to an assignment 1000 and controlling a steering motor to control a reaching direction of a robotic arm 300 according to an assignment 1000, and controlling a plurality of robotic legs to navigate the MRSV to a destination according to an assignment 1000, and controlling a plurality of robotic legs to navigate the MRSV to a user 140 according to an assignment 1000: controlling one or more robotic arms 300 to handle one or more objects 601 according to an assignment 1000, and controlling one or more robotic arms to assist an operator or a 120 user 140 according to an assignment 1000.

The MRSV 100 in which the autonomous drive mode 406 associating with involving navigation arrangements for controlling a plurality of robotic legs 200 to navigate at high speed to a destination.

The object recognition system 700 providing programming for one or more of: receiving an image of an object 601 via an object 601 recognition subsystem: identifying an object 601, or receiving generating object 601 data for the perception system's sensors 407 and cameras 408 furnishing the object 601 data.

The control system algorithms calibrated for controlling the MRSV 100 according to an assignment providing various programming and algorithms to position the MRSV 100 according to object 601 within an operating environment, and algorithms for controlling a plurality of robotic legs maneuvers at multiple degrees of freedom to step, walk or drive on various indoor environments 118 and/or outdoor environments 119, and algorithms for controlling one or more robotic arm maneuvers at multiple degrees of freedom to attain and/or manipulate one or more objects 601 within an environment 118/119.

In various elements, the control system 400, when the MRSV 100 is parked at a predetermined area (e.g., walking spot) or taken out from the predetermined area, the MRSV 100 moves at a very low speed. During walking or driving, centrifugal force of curved path or route is marginal so that the minimum turning outer radius of the wheel 203, and rotation radius of the wheel 203 may be determined based on its rotation angle.

In various elements, the control system 400, upon receipt and processing of the by-wire input commands, issues individual by-wire commands to each of the embedded controllers. The entire control operation is achieved by-wire as noted above. i.e., without direct mechanical linkages between the user input devices and the steering, propulsion, or braking subsystems being controlled in response to the user's inputs commands.

The MRSV 100 in which the control system 400 further comprises a control network 800 providing real-time administration by teleoperation processes to control motion, position, performance or to determine context assignments involving one or more of: controlling a plurality of robotic legs 200 to navigate the MRSV to a user 140: controlling one or more robotic arms 300 to handle one or more objects 60, and controlling one or more robotic arms 300 to assist an operator 120/user 140.

The MRSV 100 in which the control system 400 further comprises a cloud computing network 900 associated with providing real-time controlling processes to control motion, position, performance or to determine context assignments involving controlling a plurality of robotic legs 200 to navigate the MRSV 100 to the user 140, or controlling one or more robotic arms to handle one or more objects 601, or controlling one or more robotic arms 300 to assist an onboard operator 120 or when needed to assist a user 140 upon pick-up summoning or drop off summoning.

The control system 400 can turn on an emergency light of the MRSV 100 for a predetermined time to inform that the remote control is restricted. Further, a headlight of the MRSV 100 may be turned on by the control system 400 for a predetermined time to inform that the operation for remotely controlling a driving operation of the MRSV 100 is restricted. It is possible to notify that remote control is restricted by turning on a high beam of the headlight of the MRSV 100 a predetermined number of times for a predetermined time.

Additionally, each leg array 200 houses individual steering, propulsion, braking, and suspension systems. Independent control of each leg array 200 is supervised by the master controller and backed up by a redundant secondary master controller, with various embedded controllers communicating as needed with the controllers 1100/1200 via Ethernet for Control Automation Technology (EtherCAT) or another suitable high-speed connection.

The MRSV 100 in which an operator being an operator 120 riding onboard to control motion, position, performance via various onboard controller devices 1100, detailed in FIG. 7.

The MRSV 100 in which a remote operator 130 to control motion, position, performance, context of the MRSV 100 via a remote controller device 1200, detailed in FIG. 7.

In addition, the autonomous systems 405/406 can be realized on an integrated router associated with the autonomous driving, the control system, a remote server like the control network 800 and/or the cloud computing network 900 to execute all or part of the steps of the method according to the embodiments of the present application. And the aforementioned storage medium includes various media capable of storing program codes.

The MRSV 100 embodiments described above are merely illustrative, and for example, the flowchart and diagrams in the figures illustrate the architecture, functionality, and operation of possible implementations of apparatus, methods and computer program products according to various embodiments of the present application. In this regard, it will also be noted that each of the diagrams and/or flowchart illustration, can be implemented by special purpose hardware-based systems which perform the specified functions or acts, or combinations of special purpose hardware and computer software instructions.

The MRSV 100 functions, if implemented in the form of software functional modules and sold or used as a stand-alone product, may be stored in a computer readable storage medium. Based on such understanding, the technical solution of the present application or portions thereof that substantially contribute to the prior art may be embodied in the form of a software product stored in a storage medium and including instructions for causing a computer device. In addition, the autonomous system can be realized on an integrated router associated with a remote server via various Networks to execute all or part of the steps of the method according to the embodiments of the present application. And the aforementioned storage medium includes various media capable of storing program codes.

The MRSV 100 corresponding remedial strategy is provided to maintain the automatic driving function of the MRSV 100 and ensure the driving safety.

In other embodiments of the present invention further comprises a plurality of calculation units, a sensor fusion unit and a planning control unit which are coupled to one another via a CAN bus. The data exchange unit and the calculation unit are implemented by using FPGA chips, and the sensor fusion unit and the planning control unit are implemented by using SOC chips.

In some embodiments, the control system 400 may also be implemented using a distributed set of computing devices connected by a communications network 800/900, or based on CLOUD 701, Internet 702, Wi-Fi 703, and Bluetooth 705, and smartphones 706, various computers 707 and various can components 1100. In such systems, a plurality of distributed computing devices operate together to provide services through the use of shared resources. As an example, a plurality of vehicles traveling on a highway may be connected to a common server that provides current road information, speed limit information, and the like, so that each vehicle generates a corresponding driving control instruction based on the common information and a video data stream, sensor data, and the like.

Those of skill in the art would appreciate that the various illustrative logical blocks, modules, circuits, and algorithm steps described in connection with the aspects disclosed herein may be implemented as electronic hardware, computer software, or combinations of both. To demonstrate interchangeability of hardware and software, various illustrative components, blocks, modules, circuits, and steps have been described above generally in terms of their functionality. Whether such functionality is implemented as hardware or software depends upon the particular application and design constraints imposed on the overall system.

In various operations the control system 400 is associated with the MRSV 100 according to embodiments of the disclosure can include a wireless communication components 700 configured to perform communication with a remote controller device 1200. The wireless communication components 700 can transmit to, and receive from, the remote controller device 1200 via data signals related to various operations of the MRSV 100. The MRSV's PDQP 500 is configured to recognize a position of the remote controller device 1200 when the communication unit 100 receives an instruction signal for remotely controlling a driving operation of the MRSV 100 from the remote controller device 1200, and the control system 400 configured to restrict an operation for remotely walking, driving, parking as well as docking the MRSV 100 based at least on the position of the remote controller device 1200.

In various elements the wireless communication components 700 receives an instruction signal for remotely controlling a driving operation of the MRSV 100 from the remote controller device 1200, the PDQP 500 can obtain a position of the remote controller device 1200. In response to the position of the remote controller device 1200, the control system 400 can restrict or limit the ability to the remote controller device 1200 to control a driving operation of the MRSV 100 remotely. For the purposes of the present disclosure, a "semiautonomous/autonomous driving operation" of the MRSV 100, which is subject to remote control from the remote controller device 1200, may refer to, for example, walking the MRSV 100, pulling the MRSV 100 out of a walking spot, or otherwise driving the MRSV 100.

At this time, the control system 400 may perform an operation for informing or notifying a user having the remote control device 1200 that the operation for remotely walking, driving, or parking the MRSV 100.

Accordingly, when the current position of the remote operator 130 is located away from the MRSV 100, e.g., the remote controller device 1200 is not located within a predetermined area (i.e., closer than a predetermined distance from the MRSV 100), the remote walking and driving functions of the MRSV 100 may be restricted. It is because the control system 400 can determine that the instruction signal for remotely controlling a driving operation of the MRSV 100 is under the control of the remote operator 130 or taken over by a network 800/900 through wireless communication processes.

Further, when the remote controller device 1200 may be erroneously operated by a teleoperator at a location far from the MRSV 100 accordingly can control the MRSV 100 from afar.

That is, when the instruction signal from the remote controller device 1200 is received via the wireless communication components 700, the control system 400 instructs the PDQP 500 to determine the position of the remote control device. Herein, the instruction signal is a kind of a radio frequency signal (or a low-frequency signal). According to embodiments of the present disclosure, the control system 400 can perform a low-frequency signal searching via the wireless communication components 700 to obtain the position of the remote controller device 1200.

At this time, the control system 400 may perform an operation for informing or notifying the remote operator 130 or a user having the remote control apparatus 200 that the remote control of the driving operation of the MRSV 100 is restricted because the remote controller device 1200 is placed on the estimated path or route.

In order to check the estimated path or route of the MRSV 100, a steering angle is monitored by a steering angle sensor in real time, and the rotation angle α is derived using the steering angle of the steering column and the angle mapping data of the plurality of robotic legs 200 and wheels 204.

Then, the estimated GPS 409 path or route of the MRSV 100 can be determined and schematized based on the rotation radii of MRSV 100 outer surface and MRSV 100 inner surface. The control system 400 can compare the location of the remote controller device 1200 with schematized path or route. When the remote controller device 1200 is placed on the schematized path, it can be determined that the remote controller device 1200 is on the estimated path or route for remotely controlling a driving operation of the MRSV 100.

In various elements, the control system 400 linking a plurality of controllers 1100/1200 used for operationally designated operating modes 405/406 is enabled by the present design. Other operating functions may include two-wheel, four-wheel, diamond, and omni-directional or "crab" steering motion, as well as a walking assignment 1000N, all of which are described herein.

In greater detail FIG. 5 is a flowchart for Posture Decision Quadratic Programming 500 (PDQP) initiated for instructions according to the following PDQP assignments 1000A-1000N. Accordingly the PDQP assignments 1000A-1000N respect to assisting an operator 120 or driving to pick up a user 130. The PDQP 500 providing a kinematics equation preferably for controlling a plurality of robotic legs 200 to have higher control accuracy relative to one of: moving in a retractable and pro-tractable manner to transition into traversed positions with respect to moving on a route, or traversing to a pose with respect to alignment according to an object 601 or traversing to a pose with respect to avoiding an object 601 according to an assignment 1000.

The PDQP 500 providing a kinematics equation preferably controlling a plurality of robotic legs to become retractable and pro-tractable to transition into a walking state and/or a rolling or driving state, and having higher control accuracy relative for providing multiple degrees of freedom relative for transitioning into various traversed positions for stepping and walking to access steps, ramps, and navigate through terrain or paths according to an assignment 1000.

In various elements, PDQP 500 may initiate by-wire commands via embedded controllers. The by-wire subsystem 701 is a wireless communication components without direct mechanical linkages between the input devices and the steering, propulsion, or braking subsystems being controlled in response to inputs commands from an operator 120/130.

In various elements, PDQP 500 is linked with the actuator controllers to control movement of the robotic leg 200, wherein the actuators providing one of: retracted a pitch position for lowering the MSRV 100: protracted pitch position to raise the MRSV 100, or actuate into opposed respective PDQP instructions 501 to stabilize the MRSV 100. The corresponding remedial strategy is provided to maintain the automatic walking/driving function of the MRSV 100 and ensure the driving safety.

Further, when the PDQP 500 providing a kinematics equation preferably controlling a plurality of robotic legs to become retractable and pro-tractable to transition into a walking state and/or a driving, or sleeping state, and having higher control accuracy relative for providing multiple degrees of freedom relative for transitioning into various traversed positions for stepping and walking to access steps, ramps, and navigate through terrain or paths according to one or more of the following assignments 1000A-1000N

ASSIGNMENT A to generate a squat-down pose involving a retracting motion 501 of the plurality of robotic legs 200;

ASSIGNMENT B to generate a stand-up pose involving a protracting motion 502 of the plurality of robotic legs 200;

ASSIGNMENT C to control a stabilizing state involving protracting opposing robotic legs 200a-200d synchronized with protracting opposing robotic legs 200b-200c;

ASSIGNMENT D to generate a stepping state to traverse a stairway 111 involving a retracting motion 501 and protracting motion 502 of the plurality of robotic legs 200;

ASSIGNMENT E to generate a stepping and/or walking state to traverse a ramp 112 involving a retracting motion 501 and protracting motion 502 of the plurality of robotic legs 200;

ASSIGNMENT F to generate a stepping and/or walking state to traverse a rough terrain 113 involving a retracting motion 501 and protracting motion 502 of the plurality of robotic legs 200;

ASSIGNMENT G to generate a driving state to traverse a GPS route 409 involving a retracting motion 501 and/or protracting motion 502 of the plurality of robotic legs 200;

ASSIGNMENT H to control steering maneuvers of the robot leg 200 such that the MRSV 100 is adjacent to an object 601 or adjacent to an operator 120 or user 140;

ASSIGNMENT I to control maneuvers of the one or more robotic arms 300 which allows the MRSV 100 to attain an object 601:

ASSIGNMENT J to control maneuvers of the one or more robotic arms 300 which allows the MRSV 100 to handle an object 601, or to assist an operator 120 or assist a user 140:

ASSIGNMENT K to control maneuvers of the one or more robotic arms 300 which allows the MRSV 100 to manipulate an object 601:

ASSIGNMENT L to control maneuvers of the one or more robotic arms 300 which allows the MRSV 100 to discharge an object 601 based on automatic object collection management 530;

ASSIGNMENT M to control a driving and dumping maneuvers of the MRSV's receptacle 103 to discharge a load of objects 601 based on automatic processes of an object management subsystem 600:

ASSIGNMENT N to control a parking/docking maneuver by the operators 120/130 and the Networks 800/900.

In various elements, the PDQP docking assignment 1000N is an optional embodiment, the MRSV 100 docking capabilities, as exampled for assignment 100N is an optional embodiment. Such docking capabilities wirelessly. Once docked, the MRSV 100 is able to sleep or be charged, or as another option to exchange or share control data, and electrical power is coordinated from the power system 110 management functionality via wiring arrangements, 109, 209 and 309.

Figure 6:
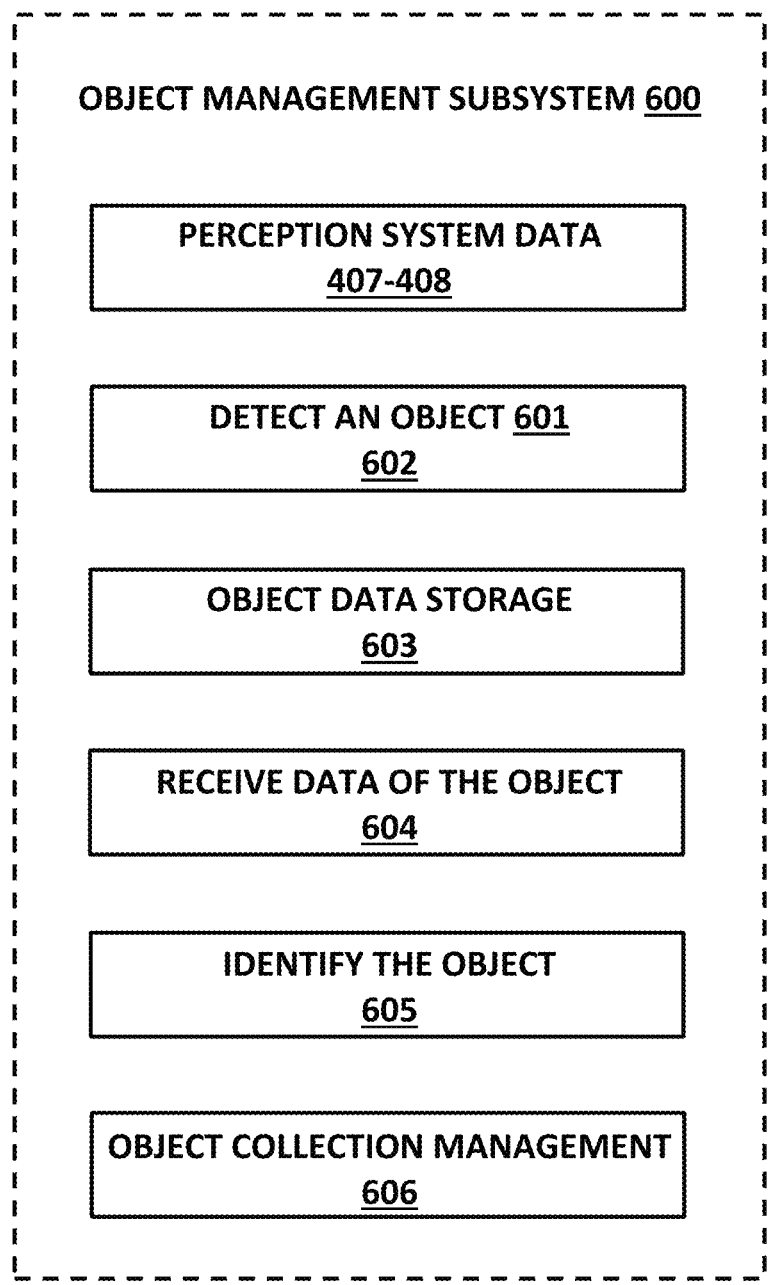
FIG. 6 is a diagram of an object management subsystem 600, in accordance with the present application.

In greater detail FIG. 6 is a diagram of the object management subsystem 600 for the MRSV 100, the object management subsystem 600 is to manage objects that become placed in the receptacle portion 103, wherein the receptacle 103 is configured with a weight measuring sensor 407 (W) that is mounted to the chassis 101. Wherein the cameras 408 generate image data via a control process integrated with a management server for automatic object collection, and based on an object portion, and a controller process is linked to a Network based integrated management server.

In various operations the MRSV 100 comprising the object management subsystem 600 to receive, store, and manage at least one among user identification information, object 601 type information, the object management subsystem 600 makes a measurement of object 601 item based on either weight, volume, or number based on the measurement information, or a second type which makes a measurement on a recyclable object 601 item based on either weight or volume.

The object collection management 600 is a centralized hub system for improving automatic waste transport. Accordingly, during autonomous object management the posture decision quadratic programming 500 controls the dumping out assignment 1000M, for automatically driving to a recycling center or to a dump site.

In various operations of the MRSV 100 the object collection assignment 601-606 utilizes is controlled by posture decision quadratic programming 500 for controlling maneuvers of robotic arm 300 to alternatively transition from various retracted configurations into various protracted configurations which allows the MRSV to extend outwardly to reach an object 601, or controlling a steering motor 303 to control a reaching direction of the robotic arm such that an implement obtains the object 601.

In various operations the object collection assignment 700 utilizes an array of sensors 407 and cameras 408 associating with recognizing and detecting object 601 via the object 601 recognition subsystem 600.

In greater detail FIG. 7 illustrates the cab components 1100 for accommodating operators and passengers in MRSV like automobiles may include sports utility vehicles (SUV), buses, trucks, various commercial vehicles, and the like which may be hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles. Additionally, it is understood that one or more of the below methods, or aspects thereof, may be executed by at least one controller. In various elements, the operator 120/130 providing commands which are transmitted by wireless communication components 700 using input and output devices 700 (I/O) like sensors 407 and cameras 408 disposed on portions of the chassis 101 and body 102, and I/O devices linked to cab components 1100, linked to a remote controller device 1200, or linked through Networks 800/900 in which controls motion and position of the MRSV 100 through wireless communication components 700 associated with CLOUD 701. Internet 702. Wi-Fi 703, and Bluetooth 705, and smartphones 706, various computers 707 and various can components 1100.

In various elements, the dashboard 1101 is configured with a control panel 1102 with touch display, the control panel 1102 connecting to the control system 400 and various control system components 400, as well the dashboard 1101 includes a steering wheel 1103 to control steering of one or more robotic legs 200, and comprising a floorboard configured with a speed pedal 1104 for controlling velocity of each motor 205 of the robotic legs 200, and a brake pedal 1105 for controlling the braking of the motor 205, and a console 1106 comprising a drive-by-wire joystick controller 1107 arranged on console 1106 between the two seating units 1108a. 1108b. Wherein the control panel 1102 providing a lock and key security system via the computer 707 for accessing use of the MRSV 100. Accordingly, the cab includes drive interface through the control panel 1102 and the smartphone 706, respectively the control panel 1102 providing virtual touch screen access for selecting settings relating to driving preferences.

In various elements, the I/O components 1101-1200 corresponding with internal sensors linking with various cab components 700-1100, wherein the I/O devices like the joystick controller 1107 or optional joystick controllers 125 for the onboard operator 120 to control the motions of the robotic legs 200 along with controlling the motions of the robotic arm 300 during semiautonomous operation. Accordingly, during autonomous object management, the automatically identifies, obtains, handles, manipulates, and discharges an object 601 via PDQP 500 controls a reaching direction of the robotic arm 300 such that an implement obtains one or more objects 601.

In various elements, the remote operator 130 providing input or commands which are transmitted from various user input devices i.e., a hand held remote controller device 1200 linking to the control panel 1102 providing optional steering and velocity control according to an assignment 1000. The remote controller device 1200 can be any style of remote controller configuration which can be linked to software updates and/or an APP. The term "controller" may refer to a hardware device that includes a memory and a processor. The memory is configured to store program instructions, and the processor is specifically programmed to execute the program instructions to perform one or more processes which are described further below. Moreover, it is understood that the below methods may be executed by an apparatus comprising the controller in conjunction with one or more other components, as would be appreciated by a person of ordinary skill in the art. Furthermore, the controller of the present disclosure may be embodied as non-transitory computer readable media containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed throughout a computer network so that the program instructions are stored and executed in a distributed fashion, e.g., by a telematics server or a Controller Area Network (CAN).

Figure 8:
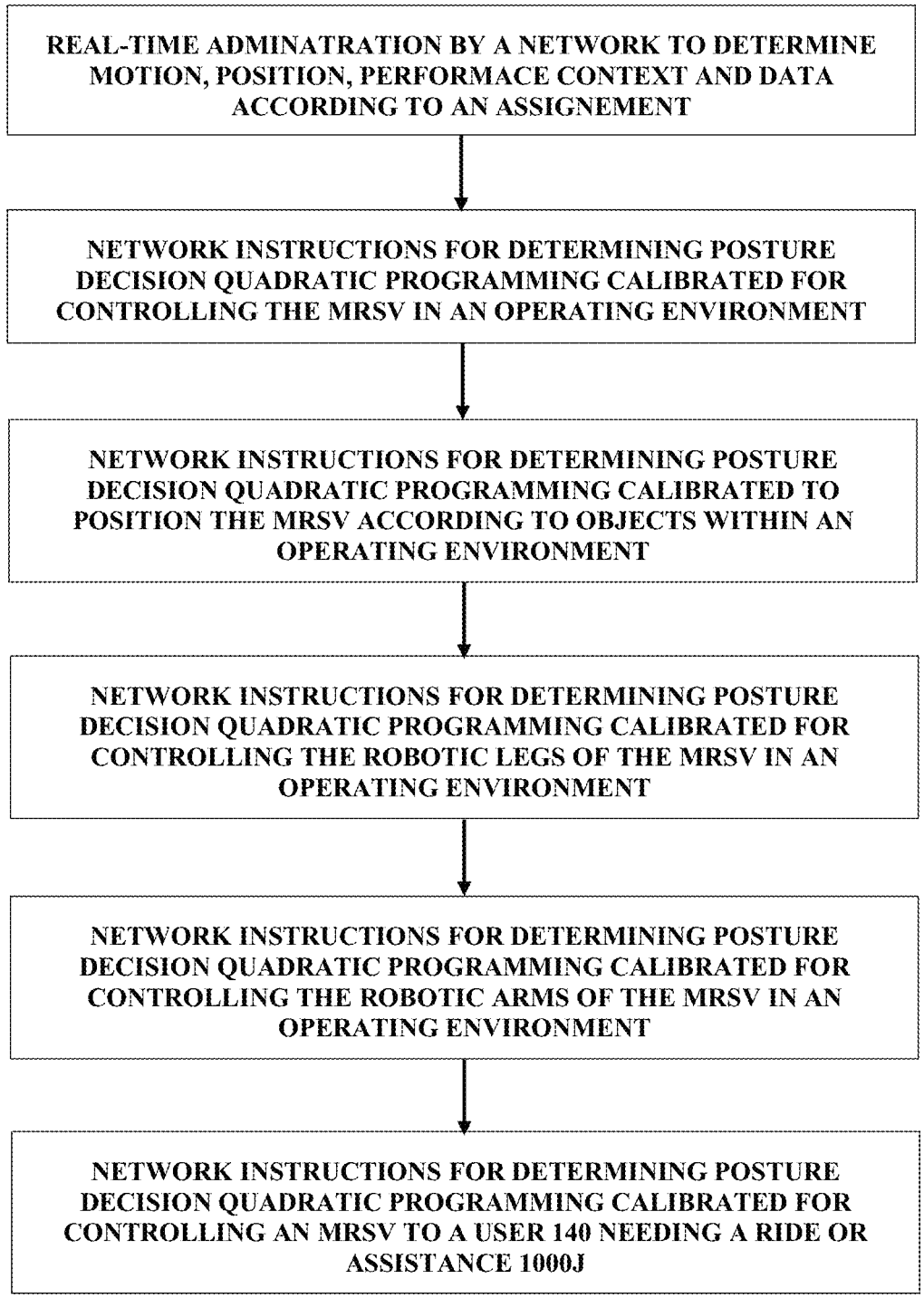
FIG. 8 is a flowchart of the cloud network 800, in accordance with the present application.

In greater detail FIG. 8 is a flowchart of the cloud network 800 associating with real-time administration to determine motion, position or performance context of the MRSV 100 according to a PDQP 500 assignment 1000A-1000N.

In various operations the teleoperator to provide instruction via a performance data for motion and position for alignment of the MRSV 100 to position according to real-world objects 601.

In various operations the teleoperator 801 to determine motion, position or performance context via a posture decision quadratic program for controlling one or more robotic legs to maneuver the MRSV 100 at multiple degrees of freedom to step, walk or drive on various terrain.

In various operations the teleoperator 801 to determine motion, position or performance context and data 1001 received from the MRSV 100 when operating in an indoor/outdoor operating environment.

In various operations the teleoperator 801 to instruct one or more robotic arms for maneuvering at multiple degrees to attain an object 601 and to manipulate the object 601.

In various operations the teleoperator 801 to determine motion, position or performance context teleoperator to determine motion, position or performance context of the MRSV 100 according to an assignment to control motion of the MRSV 100 during the maneuver to operate in indoor or an outdoor operating environment.

In various operations the teleoperator 801 to instruct one or more robotic legs to maneuver the MRSV 100 at multiple degrees of freedom to step, walk or drive on various terrain.

Figure 9:
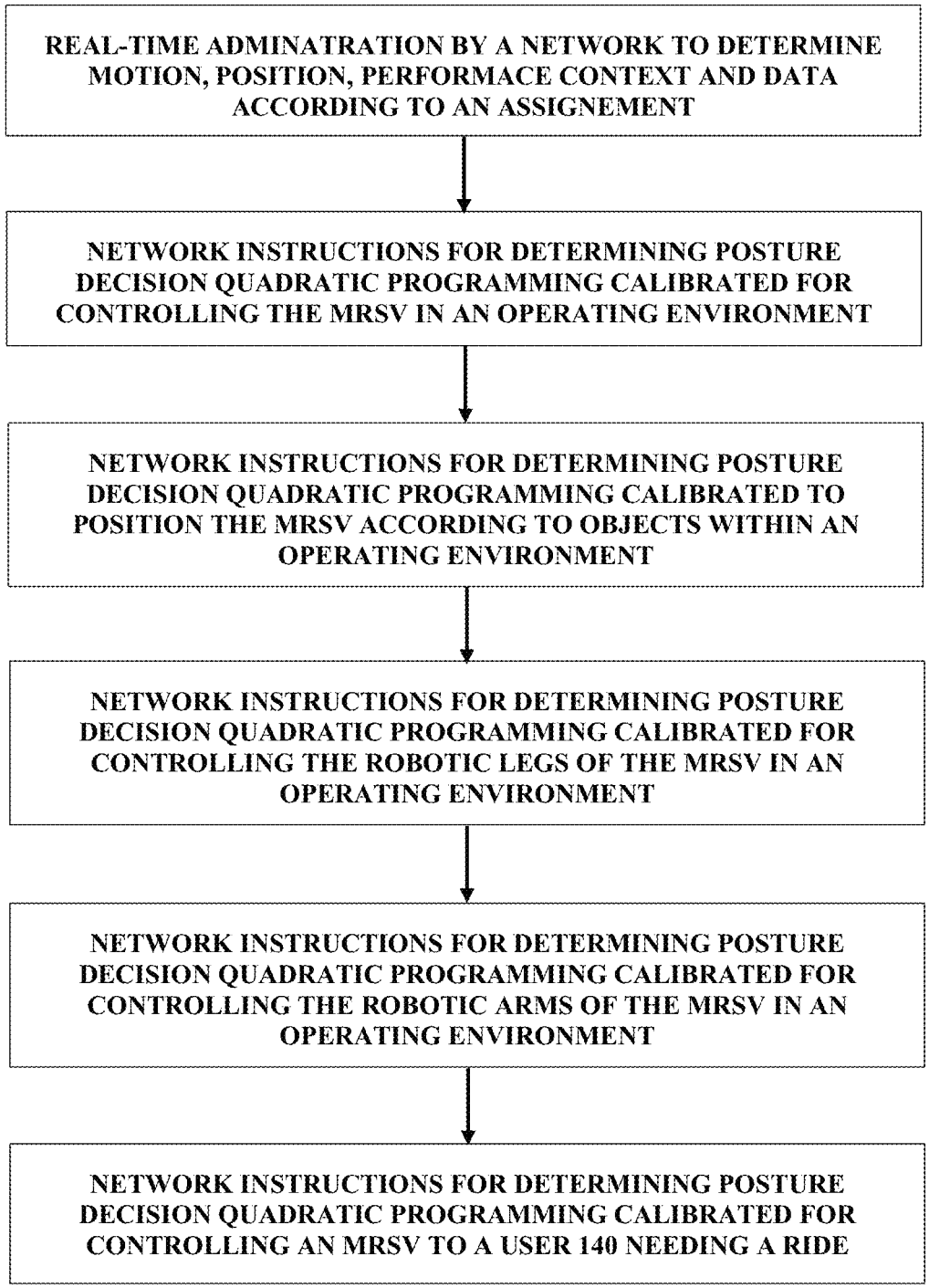
FIG. 9 is a flowchart of the cloud computing network 900, in accordance with the present application.

In greater detail FIG. 9 is a flowchart of the cloud computing network 900 associating with the real-time administration by a to determine motion, position or performance context of the MRSV 100 according to a PDQP 500 assignment 1000A-1000N.

In various operations the cloud computing network 900 to provide instruction via a performance data for motion and position for alignment of the MRSV 100 to position according to real-world objects 601.

In various operations the cloud computing network 900 to determine motion, position or performance context via a posture decision quadratic program for controlling one or more robotic legs to maneuver the MRSV 100 at multiple degrees of freedom to step, walk or drive on various terrain.

In various operations the cloud computing network 900 instruct one or more robotic arms for maneuvering at multiple degrees to attain an object 601 and to manipulate the object 601.

In various operations the cloud computing network 900 to determine motion, position or performance context and data 1001 received from the MRSV 100 when operating in an indoor/outdoor operating environment.

In various operations the cloud computing network 900 to instruct one or more robotic legs to maneuver the MRSV 100 at multiple degrees of freedom to step, walk or drive on various terrain.

The MRSV 100 functions, if implemented in the form of software functional modules and sold or used as a stand-alone product, may be stored in a computer readable storage medium. Based on such understanding, the technical solution of the present application or portions thereof that substantially contribute to the prior art may be embodied in the form of a software product stored in a storage medium and including instructions for causing a computer device.

The MRSV 100a-MRSV 100G embodiments described above are merely illustrative, and for example, the flowchart and diagrams in the figures illustrate the architecture, functionality, and operation of possible implementations of apparatus, methods and computer program products according to various embodiments of the present application. In this regard, it will also be noted that each of the diagrams and/or flowchart illustration, can be implemented by special purpose hardware-based systems which perform the specified functions or acts, or combinations of special purpose hardware and computer instructions.

Those of skill in the art would appreciate that the various illustrative logical blocks, modules, circuits, and algorithm steps described in connection with the aspects disclosed herein may be implemented as electronic hardware, computer software, or combinations of both. To demonstrate interchangeability of hardware and software, various illustrative components, blocks, modules, circuits, and steps have been described above generally in terms of their functionality. Whether such functionality is implemented as hardware or software depends upon the particular application and design constraints imposed on the overall system.

While the best modes for carrying out the many aspects of the present teachings have been described in detail, those familiar with the art to which these teachings relate will recognize various alternative aspects for practicing the present teachings that are within spirit and the scope of the appended claims.

I claim:

1. A modular robotic service vehicle (MRSV) comprising:
a chassis coupled to a body;
one or more robotic legs including a steering mechanism, actuators and a drive wheel comprising a motor and motor controller connected therein, wherein the one or more robotic legs are extendable and retractable providing multiple degrees of freedom the MRSV maneuvers over pathways;
one or more robotic arms including actuators and an implement connected thereupon, wherein the one or more robotic arms are extendable and retractable providing multiple degrees of freedom in such a manner that the MRSV maneuvers to attain one or more objects;

one or more robotic legs and one or more robotic arms being rotatably connected to the chassis and to the body via chassis couplings in a horizontal position or in a vertical position, wherein provide a retracted a pitch position for lowering the MRSV, or provide a protracted pitch position to raise the MRSV, or actuate the wheel into different directions to stabilize the MRSV;

a control system comprising kinematics equations providing real-time administration involving controlling one or more robotic legs and the one or more robotic arms to transition in a retracted position or in protracted position in such a manner that the MRSV achieves one or more of the following maneuvers including walking, driving, attaining objects, handling objects, aiding or assisting a user;

an onboard operator, user or a Network associated with providing real-time administration involving controlling motion and position of the MRSV according to a walking or driving assignment in such a manner that the MRSV achieves one or more of the following motion states involving stepping, walking, driving on a stairway, driving on a curb, driving on a ramp, or driving on other surface, or walking or driving on various routes, pathways or terrain;

a perception system utilizing an array of sensors and cameras, the perception system sensors and cameras configured for detecting objects and generating data;

a positioning system utilizing GPS and generating various routes;

an autonomous walking mode associated with programming and software configured with calibrations for controlling stepping, walking, and driving maneuvers of the MRSV; and an operator to control motion, position, and performance of the MRSV, the operator being one of: an onboard operator, a remote operator, or a teleoperator associated with one of: Wi-Fi, Bluetooth, Internet, Cloud;

wherein the MRSV control system utilizes programming and providing real-time technical calibrations configured for controlling motion, position, and performance assignments autonomously when instructed by user inputs;

wherein the control system comprises processors with software programming configured for controlling maneuvers of the MRSV in such a manner that each robotic leg is calibrated to step, to walk or to drive through pathways;

wherein the control system comprising processors with software associated with programming calibrations configured for controlling robotic arm maneuvers in such a manner that the MRSV controls robotic leg maneuvers of the MRSV;

wherein the processors of the control system are linked to the sensors and cameras for providing data to the control system comprising processors with software programming;

wherein control system is further configured for controlling a motion and a position of the plurality of robotic legs during a walking mode of the MRV;

wherein the control system utilizes an autonomous drive mode associated with quadratic programming calibrations configured for controlling driving maneuvers in such a manner that the MRSV achieves real time autonomous path planning based on generated perception system data;

wherein the control system is further configured for initiating the one or more actuator controllers to activate one of:

a retracted pitch position for lowering the MRSV;

a protracted pitch position to raise the MRSV; or the one or more robotic legs into opposed respective directions to stabilize the MRSV.

2. The modular robotic service vehicle of claim 1, wherein the chassis further comprises:

a body configuration for a vehicle characterized as being at least one of: a cart, a wheelchair, a scooter, a car, a truck, an all-terrain vehicle utilized to work according to an assignment for transporting passengers and payloads;

wherein when the MRSV is manually controlled by a user or present operator within the MRSV utilizing devices comprising one or more of the following: a brake pedal, an accelerator pedal, a human machine interface (HMI) screen, and a steering wheel.

3. The modular robotic service vehicle of claim 1, wherein the chassis further comprises:

a robotic leg including: a steering mechanism, a hip actuator, a knee actuator, an ankle actuator;

a drive wheel providing multiple degrees of freedom for rotating the robotic leg in different directions;

a chassis coupling, wherein the chassis coupling is connected between the steering mechanism and the robotic leg in a horizontal or a vertical position, wherein the steering mechanism provides multiple degrees of rotation to maneuver the MRSV in different directions;

a robotic arm including: a shoulder actuator, an elbow actuator, a wrist actuator and an implement connecting thereupon, wherein the chassis coupling is connected between the steering mechanism and the robotic arm in a horizontal or a vertical position, wherein the robotic arm is extendable providing multiple degrees of rotation in such a manner to maneuver the robotic arm in different directions.

4. The modular robotic service vehicle of claim 1, wherein the robotic leg further comprises:

a control system providing real-time technical calibrations for autonomously controlling motion and position and performance assignments according to user input;

quadratic programming calibrated for controlling maneuvers of robotic leg to alternatively transition from various retracted configurations into various protracted configurations which allows the MRSV to step, walk and drive on various pathways and terrain according to an assignment;

wherein the user input commands are configured for controlling motion of the actuators and the drive motors for each robotic leg of the plurality of robotic legs to flexibly transpose and hoist the MRSV over uneven terrain or over obstacles, and for controlling a speed of the drive wheel motor.

5. The modular robotic vehicle of claim 1, wherein the control system further comprises:

a positioning system utilizing GPS generating route which the MRSV travels;

real-time administration by a user or a present operator to control motion, position, performance or to determine context according to an assignment in GPS environments accordingly to other remote users or other remote operators using a wireless Network.

6. A modular robotic service vehicle comprising:
a chassis coupled to a body;
the body configured as a service vehicle utilized to work according to an assignment for task handling of one or more objects, to transport user(s) and/or payloads and objects;
a robotic leg including actuators and a drive wheel comprising a motor connecting therein, wherein the leg is extendable providing multiple degrees of freedom;
a robotic arm including actuators and an implement connecting thereupon, wherein the robotic arm is extendable providing multiple degrees of freedom;
a control system associated with one of:
programming calibrated for controlling one or more robotic legs to maneuver the MRSV at multiple degrees of freedom to step, walk or drive on various terrain based on generated perception system data;
programming calibrated for controlling one or more robotic arms to maneuver the MRSV at multiple degrees of freedom to attain one or more objectives based on generated perception system data;
a perception system utilizing an array of sensors and cameras, the sensors and cameras configured for detecting objects and generating data;
a positioning system utilizing GPS generating route which the MRSV travels;
real-time administration by a present user/present operator to control motion, position, performance or to determine context according to an assignment, accordingly the other remote user/operator associated with a wireless Network.

7. A modular robotic service vehicle comprising:
a chassis coupled to a body;
a robotic leg including actuators and a drive wheel comprising a motor connecting therein, wherein the leg is extendable providing multiple degrees of freedom;
a robotic arm including actuators and an implement connecting thereupon, wherein the robotic arm is extendable providing multiple degrees of freedom;
a control system associated with one of:
programming configured to drive the drive wheel to a user when summoned, and/or programming configured to obtain and handle objects or to assist humans via robotic arms with handling ability by various implements based on generated perception system data;
programming for controlling one or more robotic legs to maneuver the MRSV at multiple degrees of freedom to step, walk or drive on various terrain according to an assignment;
programming for controlling one or more robotic arms to maneuver the MRSV at multiple degrees of freedom to attain one or more objectives;
a perception system utilizing an array of sensors and cameras, the perception sensors and cameras configured for detecting objects;
a positioning system utilizing GPS for generating a route in which the MRSV travels;
wherein the positioning system utilizes one or more networks for providing real-time administration by teleoperation processors accordingly though teleoperators.

8. The modular robotic service vehicle of claim 1, further comprising a hip actuator, wherein a hip actuator comprises:
a plurality of actuators calibrated to provide X axis and Y axis of rotation, wherein a knee actuator is configured for providing a Y axis of rotation, an ankle actuator is configured providing X axis and Y axis of rotation, wherein the ankle actuator is rotatably configured, via a motor connecting therein, the motor being a DC motor having braking capability, wherein the drive wheel is configured to function like a foot when powered off to step in different directions.

9. The modular robotic service vehicle of claim 1, wherein the one or more robotic arms configurations further comprise:
a shoulder actuator that provides X axis and Y axis of rotation, an elbow actuator that provides a Y axis of rotation;
a wrist actuator providing X axis and Y axis of rotation, wherein the implement is rotatable connected at an end of a wrist actuator;
the implement being one of: a gripper-like hand, a suction mechanism or other object manipulating device;
wherein the gripper-like hand comprises one or more actuators for gripping an object,
wherein the implement is calibrated for manipulation of an object or releasing the object,
wherein a suction mechanism is configured for attaching on to the object and then discharging the object.

10. The modular robotic service vehicle of claim 1, wherein the perception system further comprises:
programming calibrated for communicating with a perception system utilizing an array of sensors and cameras, wherein the perception system comprises sensors and cameras configured for detecting objects and for capturing images surrounding the MRSV, and wherein the positioning system utilizes GPS for generating a current location and for generating one or more route destinations.

11. The modular robotic service vehicle of claim 1, wherein the control system further comprises:
programming configured for receiving an image of an object via an object management subsystem such that the one or more robotic arms attain or manipulate an object through processed object data; or
programming configured for identifying an object; or
programming configured for generating object data.

12. The modular robotic service vehicle of claim 1, wherein the control system further comprises:
programming configured for controlling one or more robotic leg motion and position configurations when navigating through various GPS routes based on perception system sensors and cameras configured for generating data.

13. The modular robotic service vehicle of claim 1, wherein the control system further comprises:
processors providing a kinematics equation or calibrations configured for controlling the one or more robotic legs to have higher control accuracy relative to motion states involving one of:
moving in a retractable and pro-tractable manner to transition into traversed positions with respect to moving on a route;
traversing to a pose with respect to alignment according to an object or to an operator;
traversing to a pose with respect to avoiding an object.

14. The modular robotic vehicle of claim 1, wherein the control system further comprises:
processors providing programming configured for controlling one or more robotic leg motion states providing extendable freedom, for providing multiple degrees of freedom to transition from a retracted configuration into a protracted configuration and to transition into other traversed positions for stepping, walking, accessing steps, accessing ramps, and/or navigating through routes or terrain based on the generated perception system data.

15. The modular robotic vehicle of claim 1, wherein the control system further comprises:

programming configured for controlling the one or more robotic legs such that the one or more robotic legs are retractable and pro-tractable to transition into traversed positions for walking and/or rolling whilst navigating through terrain or traversing through GPS routes.

16. The modular robotic service vehicle of claim 1, wherein the control system further comprises:

a kinematics equation providing real-time administration involving controlling the one or more robotic legs and/or the robotic arms to retract or protract in bending positions for achieving walking, driving, attaining and handling objects, and/or for aiding or assisting others or a present operator.

17. The modular robotic service vehicle of claim 1, wherein the control system further comprises:

wireless communication linked with an operator of a Network associated with providing real-time administration involving controlling one of:

motion of the MRSV according to an assignment;

position of the MRSV according to the assignment;

motion and position of the MRSV for aiding or assisting an operator or a user.

18. The modular robotic service vehicle of claim 1, wherein the control system further comprises:

wireless communication linked with an operator of a Network associated with providing real-time administration involving controlling the one or more robotic legs to transpose in a retracted and/or in protracted manner for achieving a maneuver for at least one of:

stepping on a stairway, curb or ramp surface;

walking on various pathways or terrain; and driving on various routes or terrain.

19. The modular robotic service vehicle of claim 1, wherein the control system further comprises:

wireless communication linked with a user/or present operator of a Network associated with providing real-time administration involving controlling the one or more robotic arms to transpose in a retracted and/or in protracted manner for achieving at least one of:

obtaining an object;

handling an object;

manipulating an object;

discharging an object;

moving or handling an operator or a user of the modular robotic service vehicle.

20. The modular robotic service vehicle of claim 1, wherein the control system further comprises:

cloud computing based on real-time administration programming for the MRSV to be summoned by a user and then to drive to the user;

the cloud computing configured for providing real-time administration by the teleoperation processors to control motion, position, performance of the MRSV or to determine context through various other control systems, other cloud computing networks, and teleoperator assignments which may involve one or more of the following Network processes:

the other control systems, or the other cloud computing networks, or the teleoperator assignments involving controlling the motion of the plurality of robotic legs to drive the MRSV to one or more GPS generated locations; or the other control systems, or the other cloud computing networks, or the teleoperator assignments associated with providing a real-time control a process to control motion, position, performance or to determine context assignments; or the other control systems, or the other cloud computing networks, or the teleoperator assignments associated with providing a real-time control process for controlling motion of the plurality of robotic legs to navigate the MRSV to the user; or the other control systems, or the other cloud computing networks, or the teleoperator assignments associated with providing a real-time control process for controlling motion of the one or more robotic arms to handle one or more objects; or the other control systems, or the other cloud computing networks, or the teleoperator assignments associated with providing a real-time control process for controlling motion of the one or more robotic arms to assist an onboard operator; or the other control systems, or the other cloud computing networks, or the teleoperator assignments associated with providing a real-time control process for controlling motion of the one or more robotic arms to assist a user upon picking-up the user or upon dropping off the user.

* * * * *